Figure 1:
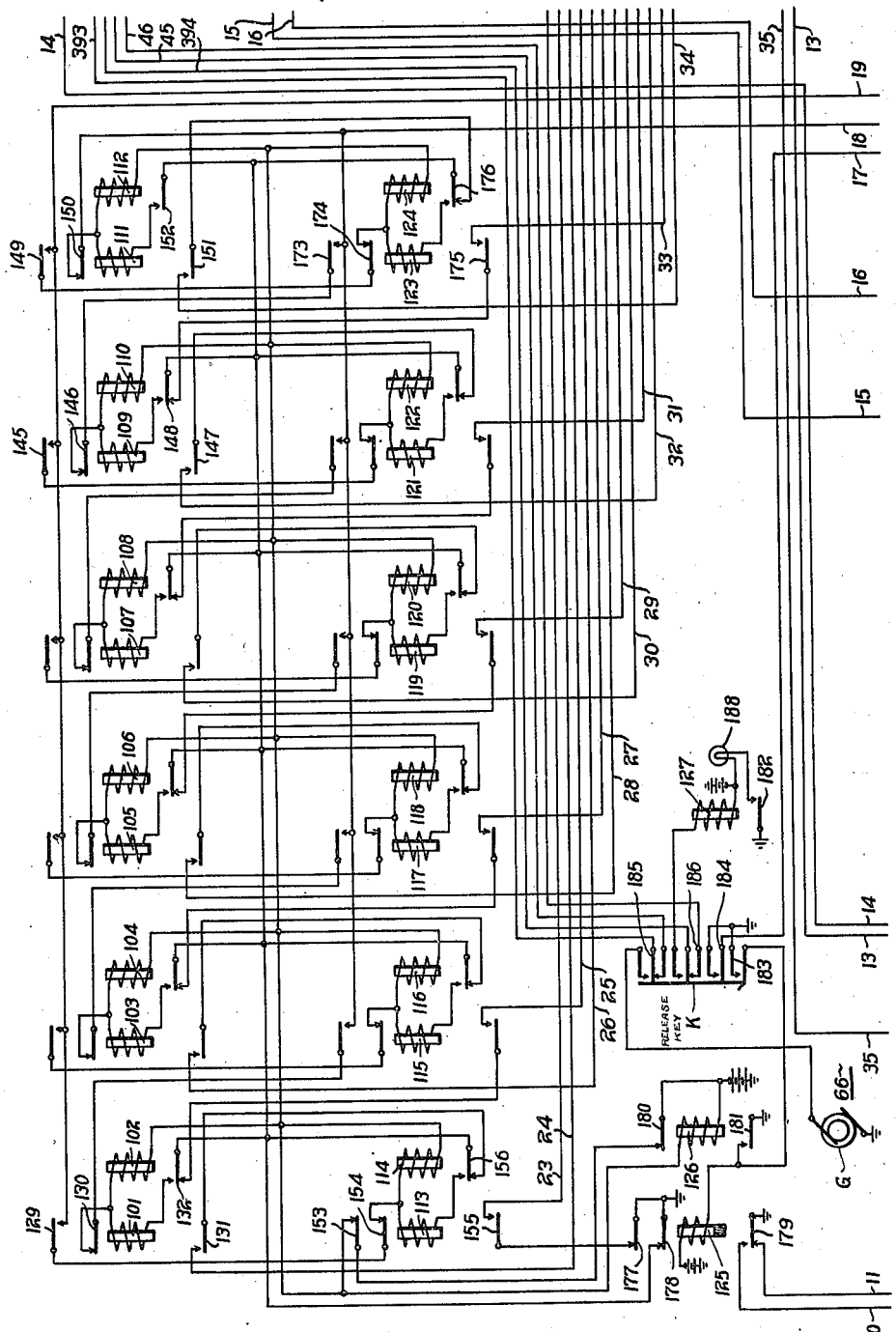

May 28, 1929.    T. U. WHITE    1,714,969
SUPERVISORY CONTROL SYSTEM
Filed March 17, 1924    8 Sheets-Sheet 6

WITNESSES:

INVENTOR
Thomas U. White.
BY
ATTORNEY

May 28, 1929.  T. U. WHITE  1,714,969
SUPERVISORY CONTROL SYSTEM
Filed March 17, 1924    8 Sheets-Sheet 8

WITNESSES:

INVENTOR
Thomas U. White.
BY
ATTORNEY

Patented May 28, 1929.

1,714,969

UNITED STATES PATENT OFFICE.

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed March 17, 1924. Serial No. 699,670.

My invention relates to supervisory control systems and particularly to systems for supervising and controlling remotely-disposed electrical equipment from a central point or dispatcher's office.

One object of my invention is to provide a supervisory control system that shall have improved synchronous control means for operating relay selecting chains at the dispatcher's office and station.

Another object of my invention is to provide a supervisory control system that shall have a chain of counting relays that are operated in a definite sequence by means of impulses without the use of series contacts thereon.

Another object of my invention is to reduce the number of counting relays that are necessary to control a predetermined number of apparatus units or circuit interrupters by providing several groups of auxiliary selecting relays and reoperating the counting chains a number of times, corresponding to the number of groups of auxiliary selecting relays.

Another object of my invention is to provide relay selecting means that shall operate at high speed until the particular apparatus unit, or signalling device, is selected and will then pause, maintaining the connection thereto until the dispatcher has controlled the apparatus unit and a signal has been given to indicate such operation.

Another object of my invention is to provide means under the control of the dispatcher at the central office for enabling him to cause the relay chain to select a predetermined apparatus unit and remain in connection therewith as long as desired, thus placing it absolutely under the dispatcher's control.

Another object of my invention is to provide means whereby the dispatcher at the central station has to reoperate his control key each time before an apparatus unit at the remote station may be controlled, to cause the apparatus unit to be operated only once, even if automatic responsive devices at the station throw it to the opposite position from that desired by the dispatcher.

Another object of my invention is to provide mechanically locking control relays to preclude any change in the supervisory signalling devices or in the apparatus units at the station should the battery supply be disconnected and reconnected.

Another object of my invention is to provide a control system in which the control circuits for operating apparatus units are responsive to alternating currents and the signalling circuits are responsive to direct currents.

Another object of my invention is to provide means whereby extra signalling conductors may be used for increasing the capacity of the selecting apparatus without increasing the number of counting relays.

Another object of my invention is to provide means for operating the dispatcher's supervisory signalling devices to indicate any change or plurality of changes in the circuit interrupters at the station, even though such changes take place before the apparatus unit is selected by the relay selecting means.

Another object of my invention is to provide improved control circuits whereby the dispatcher is precluded from inadvertently operating an apparatus unit.

A further object of my invention is to provide means under the control of the dispatcher for releasing the selecting apparatus both at the central and distant stations at his option.

There are other objects of the invention which, together with the foregoing, will be described hereinafter with reference to the accompanying drawings.

Referring now to the drawings, comprising Figures 1 to 8, inclusive, sufficient circuits and apparatus have been shown by means of the conventional diagrams to enable my invention to be readily explained and understood.

The apparatus and circuits shown in Figs. 1 to 4, inclusive, are those located at the dispatcher's office, while the apparatus and circuits shown in Figs. 5 to 8, inclusive, are those located at the substation.

In practicing my invention, I provide a chain of counting relays at the dispatcher's office and a chain of counting relays, corresponding in number, at the substation in which are located the apparatus units that it is desired to control. There are three groups of auxiliary selecting relays associated with each group of counting relays. In addition, three switching relays are provided for each group of counting relays. A control circuit is located at both the dispatcher's office and station for operating the counting relays. The counting relay chains and control circuits are connected together by means of a three-conductor trunk line, the circuits having a ground return. It is, of course, obvious that a separate common conductor may be used to eliminate difficulties due to varying ground potentials.

At the dispatcher's office, a group of keys are provided, corresponding in number to the number of apparatus units that it is desired to operate. A release key and a control key are also located at the office. In order that the dispatcher may be apprised of the condition of the apparatus units in the substation, two signalling lamps are provided for each apparatus unit.

When the dispatcher desires to control an apparatus unit at the station or substation, he will operate the key associated with that particular unit in the proper direction, and also the control key. As a result of this operation, the control circuits function to operate the relays in the counting chain in a predetermined sequence. By the operation of the control circuit, the corresponding relays in the counting chains are operated simultaneously. Thus, the counting chains operate in synchronism.

Simultaneously, with the first cycle of the counting chains, a switching relay is operated to connect in the relays of one of the auxiliary selecting relay groups and these relays are operated under the control of the counting relays. If the apparatus unit that it is desired to operate is not in this particular group, the counting relay chains will again be operated and another switching relay will be operated to connect the relays of the second auxiliary selecting groups.

In a like manner, if the apparatus unit desired is not accessible to this group, the third switching relay will be operated and the relays of the third auxiliary selecting group will be connected.

When the proper apparatus unit is selected, alternating current is sent over a control signalling conductor to operate a relay that is tuned mechanically to that particular frequency. The operation of this relay causes the operation of the apparatus unit. In the meantime, the control circuit is prevented from operating and the relay selecting apparatus maintains the connection with the selected apparatus unit. When the apparatus unit operates, a circuit is closed for operating the supervisory signalling devices at the dispatcher's office to indicate the operation of the unit and the control circuit again functions. After all the relays of the auxiliary relay groups have been operated, the chain restores to normal. In the event that the apparatus unit at the station operates under the control of automatic devices responsive to circuit conditions, the operation of the supervisory signals takes place substantially in the same manner as above described.

In the event that the dispatcher desires to observe the operation of an apparatus unit, he will operate another key of an auxiliary group and the counting chains will then function until the particular selecting relay has set up the proper connection. In this position, the operation will cease. The dispatcher may now control the selected apparatus unit in any manner he desires or observe its functioning. Upon the release of the key, the operation of the control circuit again starts and the chain releases at the end of this operation.

Referring now more particularly to Fig. 1, relays 101 to 124, inclusive, comprise a group of counting relays at the dispatcher's office. A key K is of the ordinary non-locking single-throw type common in telephone practice and this key will be termed a release key to release the operation of the apparatus. A generator G is provided to supply alternating current of a frequency of 66 cycles. Relays 125 and 126 are control relays for controlling certain operations.

Figure 2:
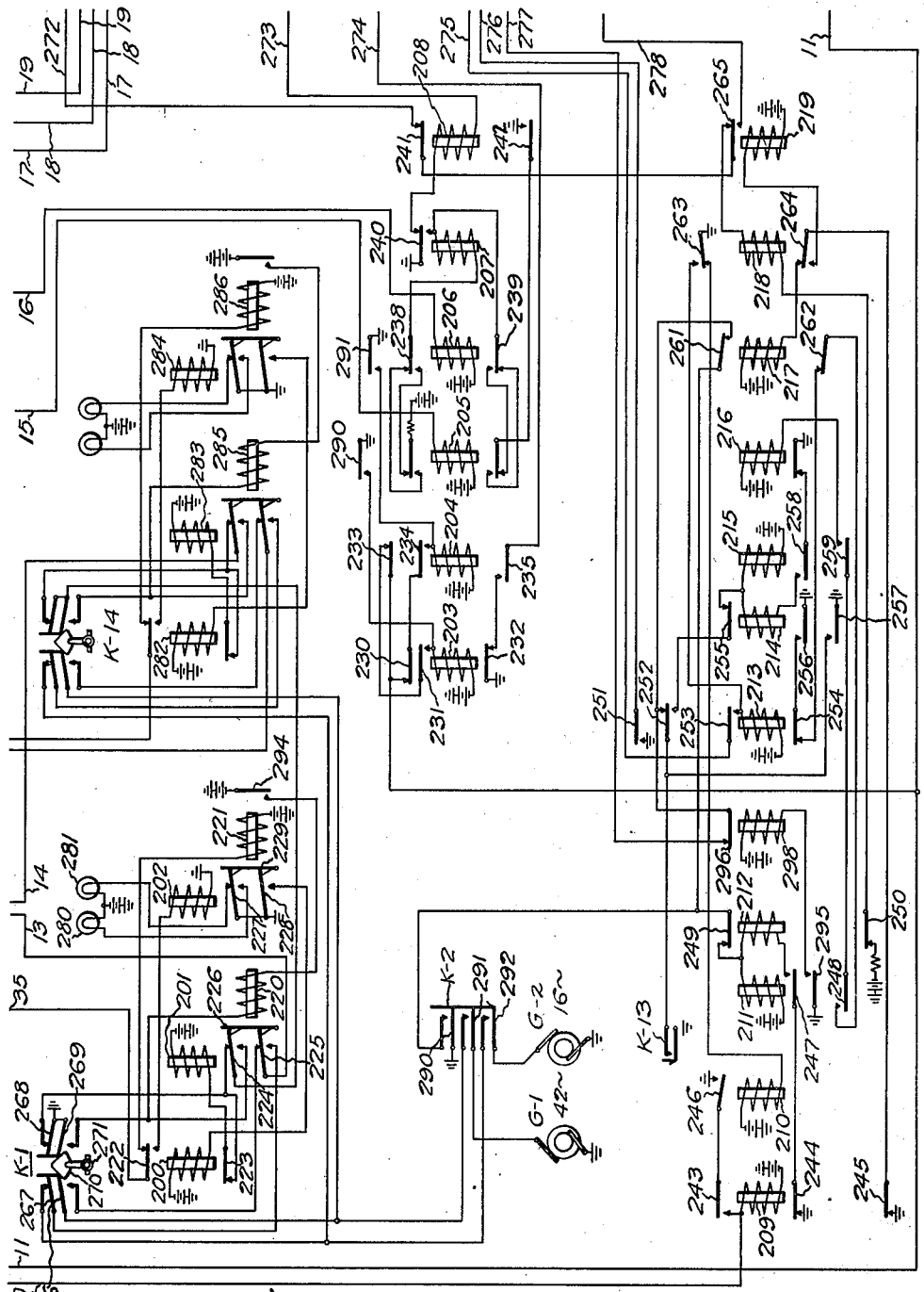

In Fig. 2, a key K—1 is a special double-throw key. There is one such key for each apparatus unit that it is desired to control. The keys, such as K—1 are so constructed that, when operated, they lock in a certain position. Thus, in order to force the springs 266 and 268 into engagement with their working contacts and the springs 267 and 269 out of engagement with their resting contacts, it is necessary to turn an operating member 271 to operate a member 270. The member 270 operates these springs. When the key is turned in the opposite direction, the operating member 271 actuates the member 270 to permit the springs to operate in the opposite manner. By this construction, it will be seen that it is impossible for the dispatcher to inadvertently operate a key by leaning upon the control board, or by the key catching in any part of his clothing.

A key K—2 is of the ordinary single-throw non-locking type and is provided for controlling the operation of all the apparatus units. Relays 200 to 202, inclusive, and relays 220 and 221 are provided for controlling the operation of supervisory signalling devices 280 and 281, and also the operation of the apparatus unit that corresponds to this key at the substation. The relays 201 and 220 have their armatures so mechanically interlocked that, when the relay 201 operates, its armature is locked in operated position until the relay 220 is energized, whereupon the locking member is withdrawn from engagement with the armature, and the armature of the relay 201 is released. The relays 202 and 221 also have their armatures interlocked in the manner described.

Generators G—1 and G—2 may be of any ordinary type and supply alternating currents of 42 cycles and 16 cycles, respectively.

Figure 4:
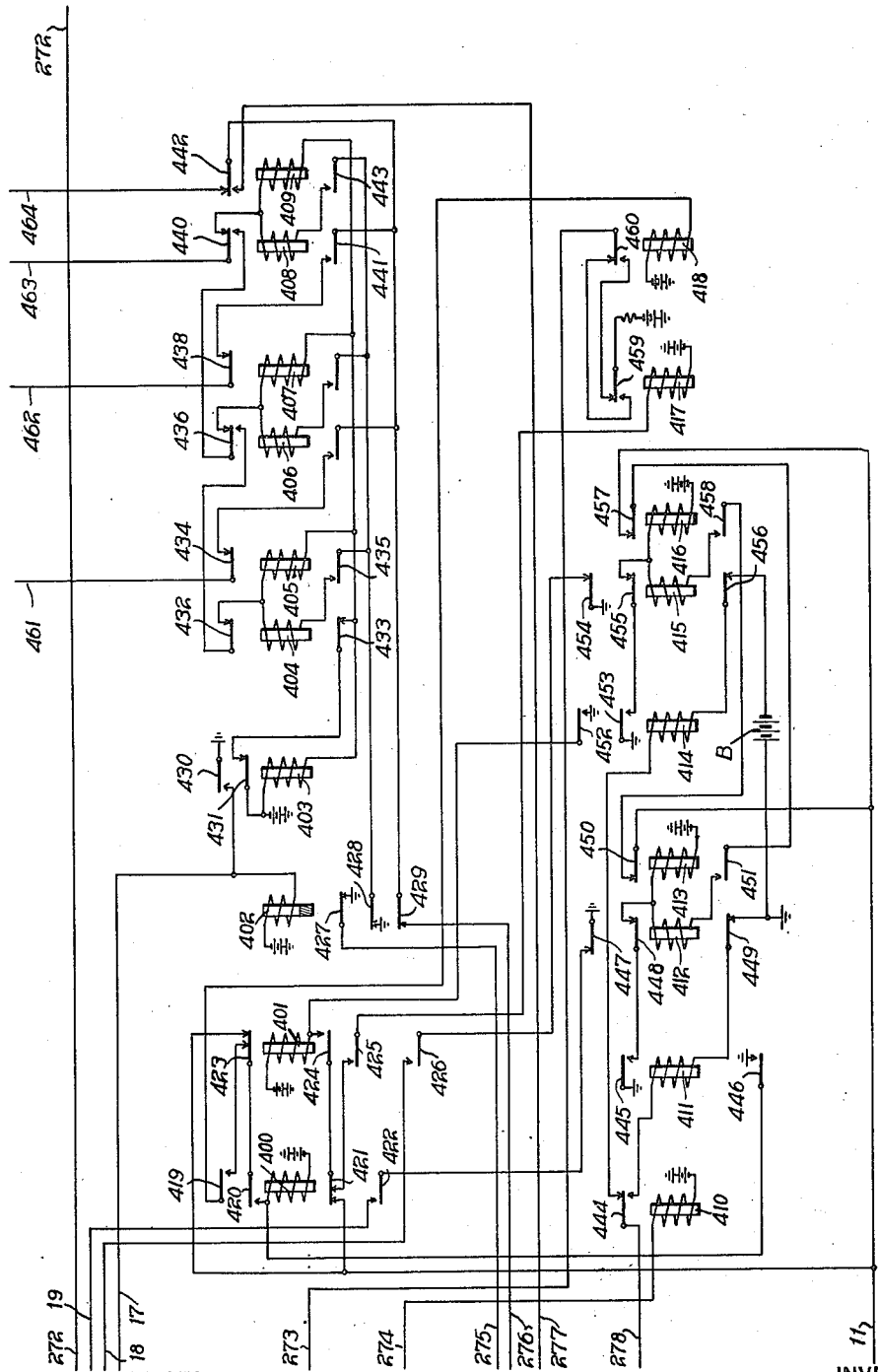

Relays 203 to 219, inclusive, Fig. 2, and relays 400 to 418, Fig. 4, comprise the control circuit for controlling the operation of the counting relays and the operation of switching relays 310 to 312, inclusive. Relays 300 to 309, inclusive, constitute an auxiliary group of selecting relays. These relays have been shown as multi-contact relays of a particular type. It will be understood that any type of multi-contact relays may be used.

Keys, such as K—3 to K—12, inclusive, are associated with each selecting relay. These keys are of the ordinary double-throw type and control the operation of the control circuit in a manner to be described. The relays 310 to 312, inclusive, are switching relays of a multi-contact type.

Figure 5:
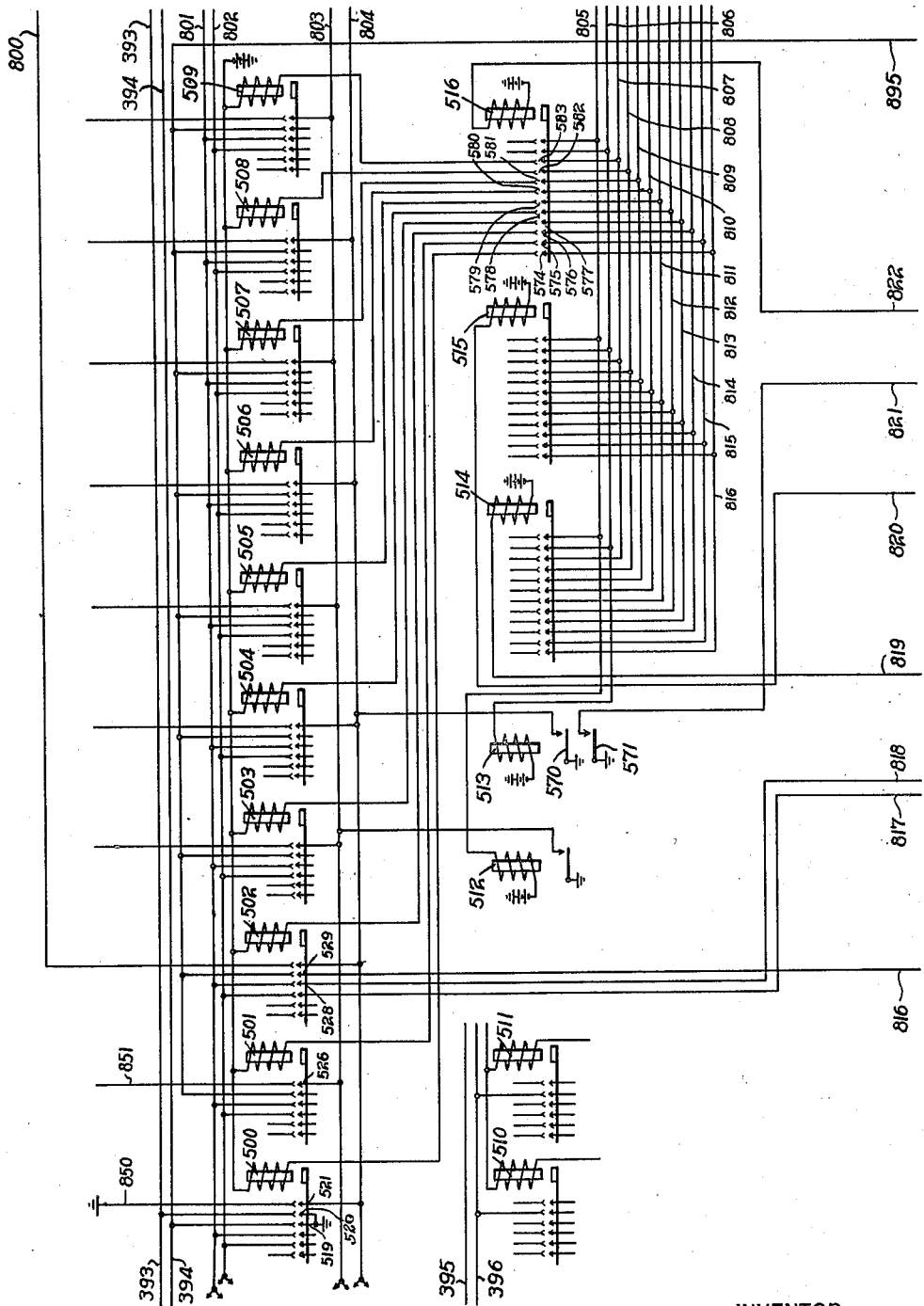
Figure 6:
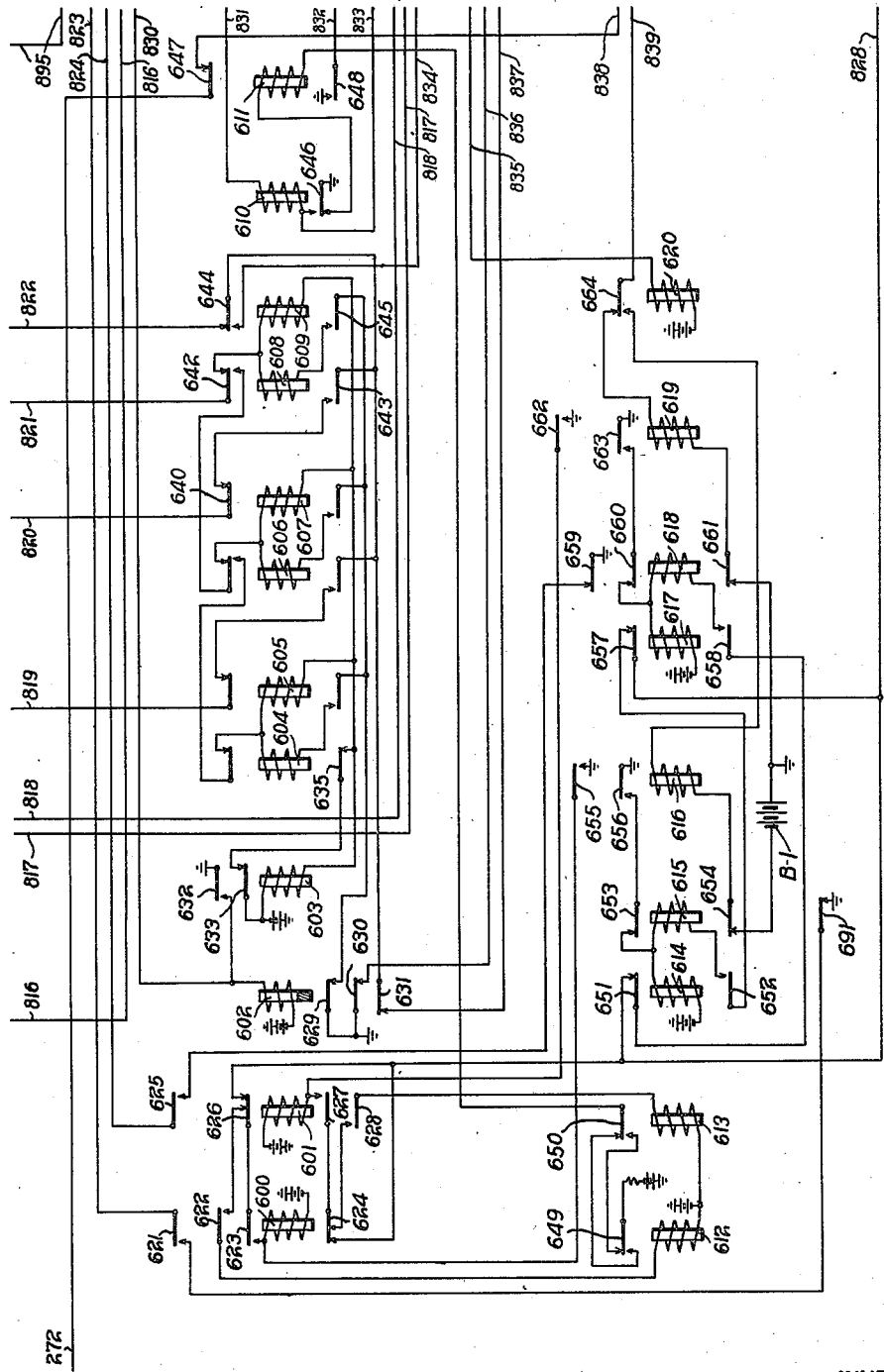

In Fig. 5, relays 500 to 509, inclusive, are the selecting relays of one group. Relays 514 to 516, inclusive, are switching relays for controlling the selection of the selecting relays. Relays 512 and 513 are control relays. Relays 600 to 620, inclusive, of Fig. 6, and relays 900 to 904, inclusive, and relays 911 to 923, inclusive, Fig. 8, constitute the control circuit at the substation. Relays 905 to 910, inclusive, and relays 924 and 925 are associated with a circuit breaker C and control the signalling of its condition and its operation. The circuit breaker C may be of any ordinary type and may function in any desired manner.

Figure 7:
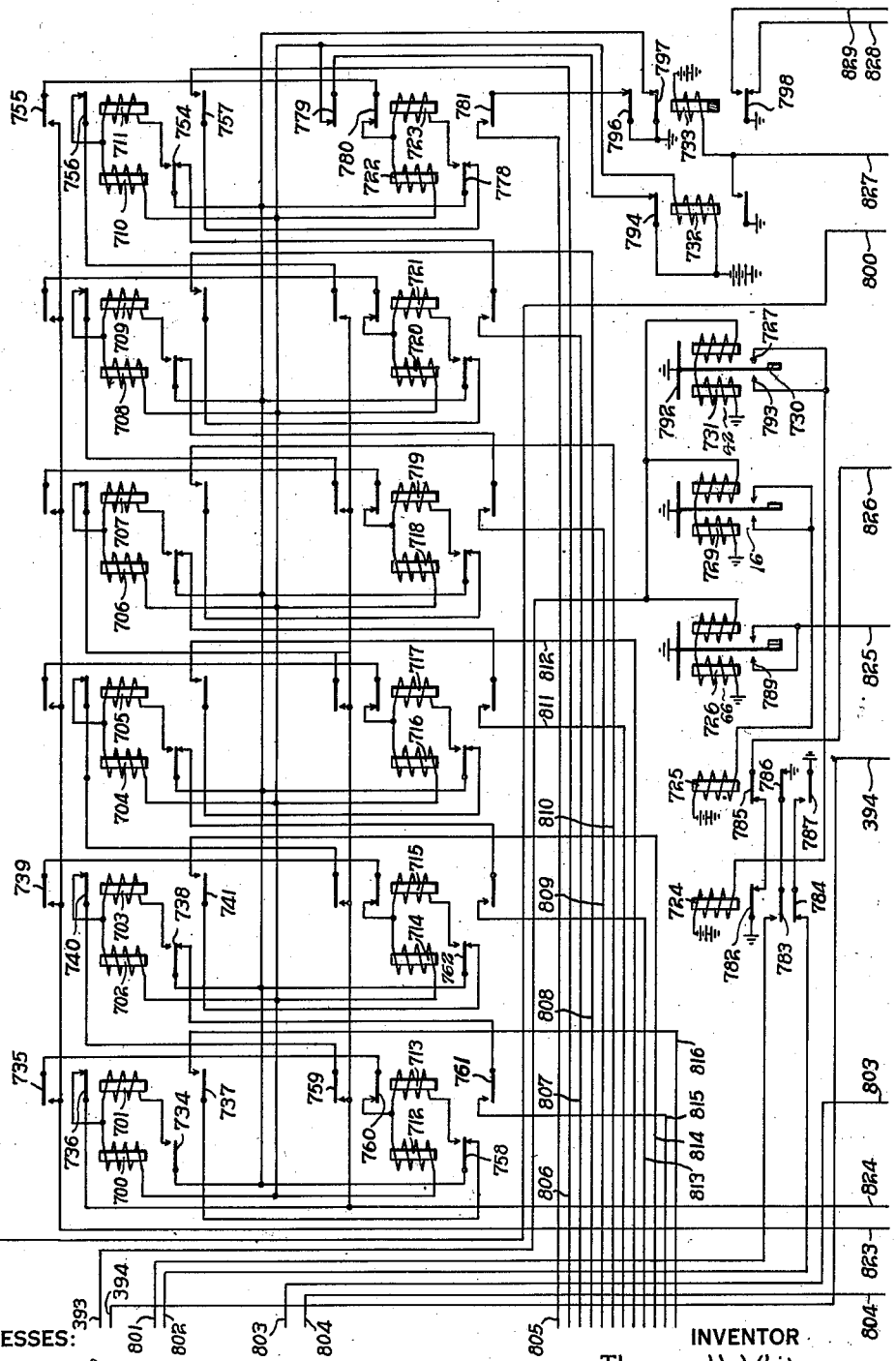
Figure 8:
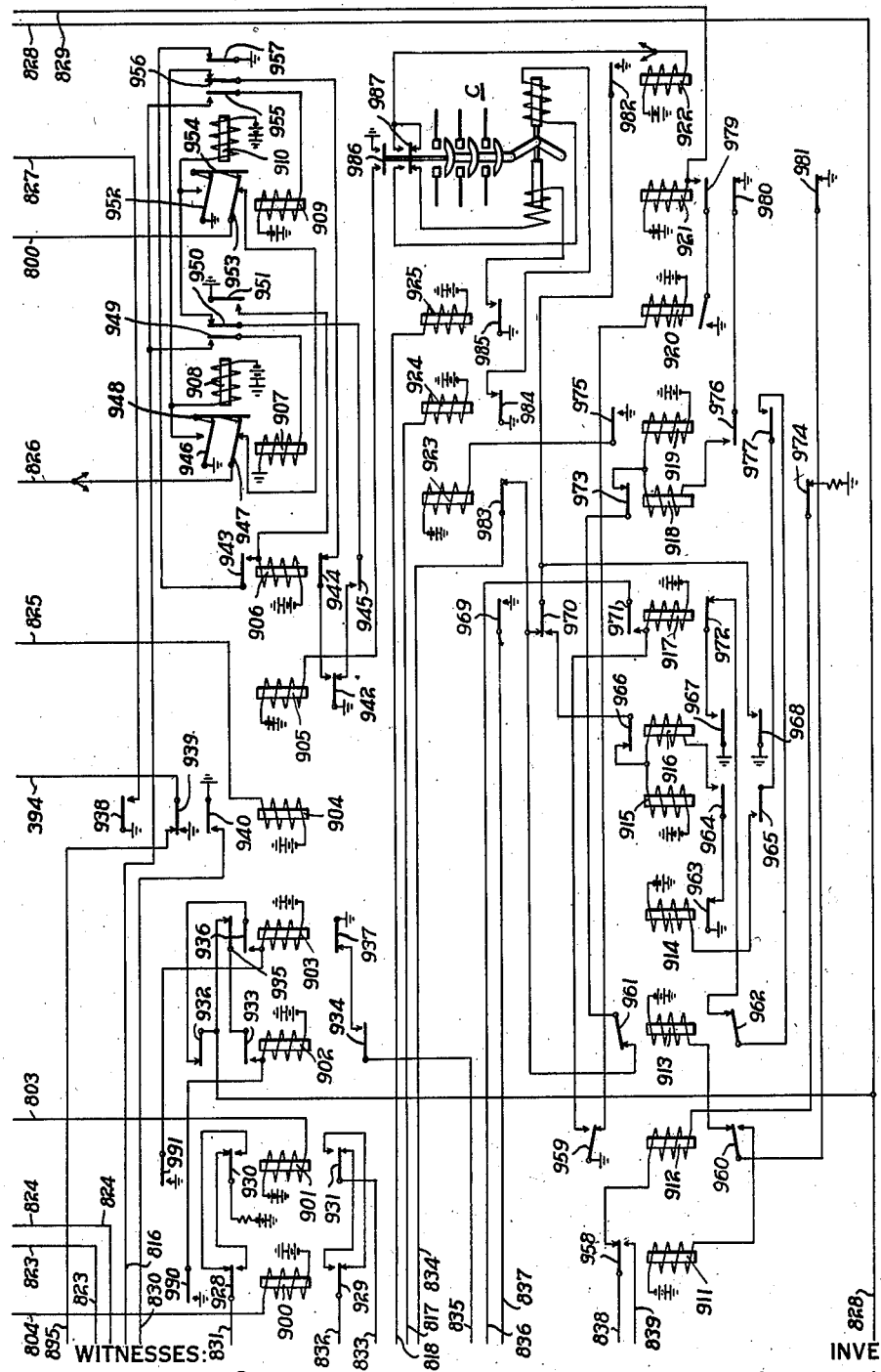

In Fig. 7, relays 700 to 723, inclusive, comprise the relays of the counting chain at the substation. Relays 724 and 725 are controlling relays, while relays 726 to 730, inclusive, are harmonic selecting relays, that is, these relays are mechanically tuned to respond to certain predetermined frequencies. Relays 732 and 733 are control relays.

The dispatcher's office is connected to the substation by means of a trunk line comprising conductors 393, 394 and 272. Two additional conductors 395 and 396 have also been shown connecting the dispatcher's office and substation to indicate how the capacity of the system may be doubled. In addition to these two conductors, when the capacity of the system is increased, there will be provided three other switching relays and three other groups of selecting relays at both the dispatcher's office and substation.

The apparatus shown in the drawings having been described in general, its detailed circuit operation will now be explained. For this purpose, it will be assumed that the dispatcher desires to operate the circuit breaker C at the station. To accomplish this result, the dispatcher will operate the key K—1 in the proper direction, it being assumed that this operation causes the springs 267 and 269 to be operated into engagement with their working contacts and springs 266 and 268 to be forced out of engagement with their resting contacts. The dispatcher will then operate the key K—2 twice.

Normally, the relays 218 and 912 at the dispatcher's office and substation are energized. The circuit over which these relays are operated extends from battery by way of back contact and armature 250, winding of relay 218, back contact and armature 265, armature 241 and its back contact, trunk conductor 272, armature 647 and its back contact, conductor 838, armature 958 and its back contact, winding of relay 912 and armature 974 and its back contact to ground.

The relay 218, upon operating, completes a circuit for the relay 210 at armature 263, and at armature 264 completes a circuit for the relay 217. The relay 217, upon being operated, prepares a circuit for the relay 216 at armature 262, and at armature 261 prepares a starting circuit from K—13, armature 252 at its upper contact to 249. The relay 210, upon being energized, opens one point in the locking circuit of the relay 209 at armature 246.

At the substation, the relay 912, upon operating, completes a circuit for the relay 920 at armature 959, and at armature 960 completes a circuit for the relay 913. The relay 913 is energized to prepare a circuit for the relay 914 at armature 962 and to prepare a starting circuit at armature 961 from armature 982 over 970.

Figure 3:
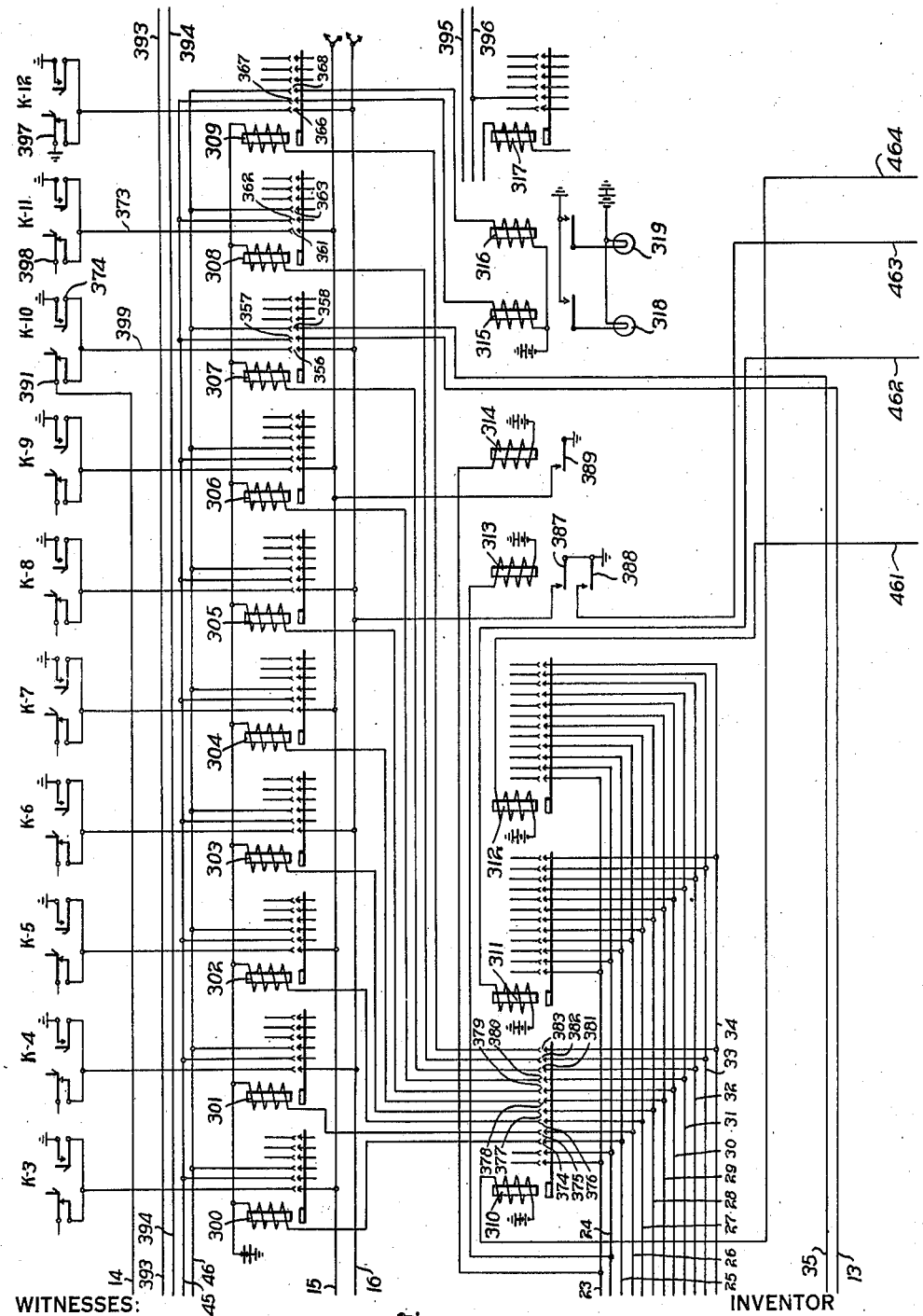

The operation of the spring 268 from engagement with its working contact removes ground from conductor 14, thereby identifying this particular key in the selecting relay group, Fig. 3. The operation of the spring 267 prepares a circuit for applying current from generator G—1 to the conductor 13.

By the first operation of the key K—2, a circuit is completed extending from ground by way of spring 290 and its working contact, armature 249 and its back contact, and winding of relay 211 to battery. The relay 211 is energized over the above circuit and operates to prepare a circuit for the relay 212 at armature 247, and to prepare a circuit for the relay 216 at armature 248.

When the key K—2 is released, the short-circuit which previously existed around the winding of the relay 212 is removed and this relay is permitted to energize to complete a circuit extending from ground by way of back contact and armature 244, armature 247 and its front contact, winding of relay 212 and winding of relay 211 to battery. Upon operating, the relay 212 at armature 249 opens the original energizing circuit of the relay 211, and at armature 250 opens the circuits of the relays 218 and 912 at the dispatcher's office and substation, respectively.

The reoperation of the key K—2 merely prepares signalling circuits in a manner to be described.

The relay 218, upon being deenergized, opens the circuit of the relay 210 at armature 263, completes a circuit for the relay 213 at the back contact of this armature, opens the circuit of the relay 217 at armature 264, and completes a circuit for the relay 219 at the back contact of this armature. The relay 210, upon being deenergized, prepares a locking circuit for the relay 209 at armature 246.

The relay 213, upon operating, establishes a locking circuit for itself at armature 253, opens one point in the circuit of the relay 216 at armature 254, at armature 252 prepares a restart circuit from K—13, armature 252 and its front contact, armature 255 and relay 215, and at armature 251 completes a circuit extending from ground by way of front contact and said armature, conductor 276, back contact and armature 429, armature 442 and its back contact, conductor 464, and winding of switching relay 310 to battery. The locking circuit of the relay 213 extends from ground by way of the back contact and armature 427, conductor 275, armature 253 and its front contact, and winding of relay 213 to battery.

The relay 217, upon being deenergized, opens one point in the circuit of the starting relay 211 at armature 261, and at armature 262 opens another point in the circuit of the relay 216. The relay 219, upon operating, opens another point in the circuit of the relay 218 at armature 265, and at the front contact of this armature prepares a circuit for the line relay 414. The switching relay 310, upon being operated, prepares circuits for the selecting relays 300 to 309, inclusive, at the springs 374 to 383, inclusive.

At the substation, the relay 912, upon being deenergized, opens the circuit of the relay 920 at armature 959, completes a circuit for the relay 917 at the back contact of this armature, opens the circuit of the relay 913 at armature 960, and at the back contact of the armature completes a circuit for the relay 911. The relay 920, upon being deenergized, prepares a locking circuit for the relay 921.

The relay 917, upon being energized, establishes a locking circuit for itself at armature 971, prepares a start circuit at armature 970 from 982 to 966 and relay 915, opens one point in the circuit of the relay 914 at armature 972, and completes a circuit at armature 969 extending from ground by way of front contact and said armature, conductor 837, back contact and armature 631, armature 644 and its back contact, conductor 822 and winding of switching relay 516 to battery. The relay 913, upon being deenergized, opens one point in the circuit of the relay 919 at armature 961, and at armature 962, opens one point in the circuit of the relay 914. The relay 911, upon being energized, prepares a circuit for the line relay 619 at armature 958, at the same time opening another point in the circuit of the relay 912.

The switching relay 516, upon being energized, at contacts 574 to 583, inclusive, prepares circuits for the selecting relays 500 to 509, inclusive.

The line circuit is now completed over a path extending from ground by way of back contact and armature 661, winding of relay 619, back contact and armature 664, conductor 839, front contact and armature 958, conductor 838, back contact and armature 647, trunk conductor 272, back contact and armature 241, armature 265 and its front contact, conductor 278, armature 444 and its back contact, winding of line relay 414, armature 456 and its back contact, to battery. The relays 414 and 619 are energized over the above circuit.

The relay 414, upon being energized, completes a circuit at armature 453 for the relay 416 and completes a circuit, at armature 452, for the relay 401. The relay 416, upon being energized, opens one point in the circuit of the relay 412 at armature 457, and at armature 458 completes a circuit extending from ground by way of armature 179 and its back contact, conductor 11, armature 450 and its back contact, armature 458 and its front contact, winding of relay 415 and winding of relay 416 to battery. The relay 415 is not energized over this circuit by reason of the fact that, as long as the original energizing circuit for the relay 416 is completed, the winding of the relay 415 is short-circuited.

The relay 401, upon being energized, opens one point in the locking circuit of the relay 400 at armature 423, establishes a locking circuit for itself at armature 424 from battery, relay 401, armatures 424 and 421, line 11, armature 179 to ground, completes a circuit for the relay 417 at armature 425, over 421, line 11 to ground, and at armature 426 a circuit is completed extending from ground by way of armature 454 and its back contact, armature 426 and its front contact, conductor 18, armature 150 and its back contact, winding of counting relay 112, back contact and armature 153, and back contact and armature 180 to battery. The relay 417, upon being energized, completes a circuit extending from battery by way of armature 459 and its front contact, back contact and armature 460, conductor 273, winding of relay 208, and back contact and armature 240 to ground. The relay 208 immediately operates to open one point in the circuit of the relay 414, thus permitting this relay to be deenergized. By the deenergization of the relay 414, the short-circuit is removed from the relay 415 and this relay is permitted to operate.

The relay 112, upon being operated, completes a circuit extending from ground by way of the back contact and armature 178, armature 152 and its front contact, winding of relay 111, winding of relay 112, armature 153 and its back contact, armature 180 and its back contact to battery. The relay 111 is not energized at this time, inasmuch as it is short-circuited as long as the original energizing circuit of the relay 112 is completed.

When the relay 415 is energized, as previously described, the original energizing circuit of the relay 112 is opened at armature 454 and the short-circuit is removed from the winding of the relay 111, thus permitting the relay 111 to be energized. Other results of the energization of the relay 415 are that the original energizing circuit of the relay 416 is opened at armature 455 and another point in the circuit of the relay 414 is opened at armature 456.

The relay 111, upon being energized, prepares a circuit for the counting relay 124 at armature 149, opens another point in the circuit of the relay 112 at armature 150, and completes a circuit at armature 151 extending from ground by way of armature 178 and its back contact, armature 176 and its back contact, armature 151 and its front contact, conductor 34, spring 383 and its working contact, and winding of selecting relay 309 to battery. The first selecting relay 309 is energized over this circuit and thereby prepares circuits for the testing relays 315 and 316.

A circuit is now completed extending from ground by way of the spring 397 of the key K—12 and its resting contact, spring 366 of relay 309, conductor 16, and winding of relay 206 to battery. The relay 206, upon operating, completes a circuit for the relay 204 at armature 291, and completes a circuit to be traced later at armatures 238 and 239 for the relay 207. The relay 204 is energized over this circuit and operates to open one point in the locking circuit of the relay 203 at armature 233 and to complete a circuit for the relay 410 over a path extending from ground by way of armature 232 and its back contact, armature 235 and its front contact, conductor 274, and winding of relay 410 to battery. The relay 410 operates to open one point in the circuit of the line relay 414 at armature 444 and to prepare a circuit for the line relay 411 at the front contact of this armature.

The relay 207 is energized over a circuit extending from ground by way of front contact and armature 242, armature 237 and its back contact, front contact and armature 239, winding of relay 207, armature 238 and its front contact, and back contact and armature 236 to battery. Upon operating, the relay 207 closes a locking circuit for itself at armature 240, and at this same armature opens the circuit of the relay 208, thereby permitting this relay to be deenergized. The relay 208, upon retracting its armature, prepares a circuit for the line relay 411 at armature 241, and opens the original energizing circuit of the relay 207 at armature 242. The relay 207 does not deenergize by reason of the fact that the previously mentioned locking circuit has been established.

At the substation, the relay 619, upon being energized over the trunk or control circuit previously described, completes a circuit for the relay 617 at armature 663, and at armature 662 completes a circuit for the relay 601. The relay 617, upon being energized, opens one point in the circuit of the relay 615 at armature 657, and at armature 658 completes a circuit extending from ground by way of armature 798 and its back contact, conductor 828, back contact and armature 651, armature 658 and its front contact, winding of relay 618, and winding of relay 617 to battery. The relay 618 is not energized at this time, inasmuch as it is short-circuited as long as the relay 619 remains energized.

The relay 601, upon operating, opens one point in the locking circuit of the relay 600 at armature 626, opens one point in the circuit of the relay 612 at the same armature, establishes a locking circuit for itself at armature 627 from battery, relay 601, armatures 627 and 624, line 828, armature 798 and ground, completes a circuit for the relay 613 over 628, 621 and line 828 at armature 628, and at armature 625 completes a circuit extending from ground by way of armature 659 and its back contact, front contact and armature 625, conductor 824, armature 736 and its back contact, winding of relay 700, back contact and armature 779, and back contact and armature 794 to battery.

The relay 700 is energized over the above circuit and, upon operating, completes a circuit at armature 734 extending from ground by way of armature 797 and its back contact, armature 734 and its front contact, winding of relay 701, winding of relay 700, back contact and armature 779, and back contact and armature 794 to battery. The above circuit is not effective to energize the relay 701 until the original energizing circuit of the relay 700 is opened, inasmuch as this energizing circuit short-circuits the winding of the relay 701.

The relay 613, upon being energized, completes a circuit at armature 650 extending from battery by way of armature 649 and its back contact, front contact and armature 650, winding of relay 611, and back contact and armature 646 to ground. The relay 611, upon operating, prepares a circuit for the relay 610 at armature 648, and at armature 647 opens one point in the circuit of the relay 619, thereby permitting this relay to be deenergized. The relay 619 retracts its armature to open the original energizing circuit of the relay 601 and to remove the short-circuit from the winding of the relay 618. The relay 618 is immediately operated to open another point in the circuit of the line relay 619 at armature 661 and to remove the short-circuit from the winding of the relay 701 at armature 659, thereby permitting this relay to be energized. The relay 701, upon being operated, prepares a circuit for the relay 712 at armature 735, opens one point in the original energizing circuit of the relay 700 at armature 736, and at armature 737 completes a circuit extending from ground by way of armature 797 and its back contact, armature 758 and its back contact, armature 737 and its front contact, conductor 816; spring 574 of relay 516 and its working contact, and winding of selecting relay 500 to battery. The selecting relay 500 is energized to connect ground to the signalling conductors 393 and 394.

By the ground upon the conductor 850, a circuit is completed extending from said ground, working contact and spring 521, conductor 804, and winding of relay 900 to battery. The relay 900 operates to complete a circuit for the relay 902 at armature 990 and to complete a circuit to be traced later for the relay 610 at armatures 928 and 929.

The relay 902 is energized over the above circuit and operates to establish a locking circuit for itself at armature 933 from battery, relay 902, armatures 933 and 935, line 828 to ground, to open one point in the locking circuit of the relay 903 at armature 932, and to complete a circuit extending from ground by way of armature 937 and its back contact, front contact and armature 934, conductor 835, and winding of relay 620 to battery.

The circuit for the relay 610 is completed over a path extending from battery by way of armature 930 and its back contact, front contact and armature 928, conductor 831, winding of relay 610, conductor 833, armature 931 and its back contact, front contact and armature 929, conductor 832, and armature 648 and its front contact to ground. The relay 610, upon being energized, opens the circuit of the relay 611 at armature 646, and at the front contact of this armature completes a locking circuit for itself.

The relay 620, upon being energized, opens another point in the circuit of the line relay 619 and prepares a circuit for the relay 616 at armature 664. The relay 611, upon being deenergized, completes the trunk or control circuit.

When the selecting relays 309 and 500 are energized, as before described, there is a circuit completed extending from ground by way of spring 519 and its working contact, signalling conductor 394, working contact 186 of key K and its resting contact, conductor 46, working contact of spring 368 and said spring, and winding of relay 316 to battery. Another circuit is completed over the signalling conductor 393 for the relay 315 from ground, spring 520, line 393, contact 185, line 45, relay 315 to battery. The relays 315 and 316 are energized to light the signalling lamps 318 and 319. The operation of these signalling devices indicates to the dispatcher that the signalling conductors are not open, inasmuch as, if one of the signalling conductors were open, no circuit would be completed for the associated relay, such as 315 or 316, and the corresponding lamp would not be lit. The continuity of all the conductors in the signalling circuit may be checked in this manner.

The control circuit previously mentioned is completed over a path extending from ground by way of back contact and armature 449, winding of relay 411, front contact and armature 444, conductor 278, front contact and armature 265, armature 241 and its back contact, trunk conductor 272, armature 647 and its back contact, conductor 838, armature 958 and its front contact, conductor 839, armature 664 and its front contact, winding of line relay 616, and armature 654 and its back contact to battery. The line relays 411 and 616 are energized over the above circuit.

The relay 411, upon being energized, completes a circuit for the relay 413 at armature 445, and at armature 446 completes a circuit for the relay 400. The relay 413, upon being energized, opens the previously traced circuit for the relays 415 and 416 at armature 450, and at armature 451 prepares a circuit for the relay 412. The relay 415, upon being deenergized, prepares one point in the circuit of the relay 414 at armature 456, and at armature 455 prepares another point in the circuit of the relay 416. The latter relay, upon being deenergized, completes a circuit extending from ground by way of armature 179 and its back contact, conductor 11, back contact and armature 457, armature 451 and its front contact, winding of relay 412, and winding of relay 413 to battery. The above traced circuit is not effective until the deenergization of the relay 411, inasmuch as the original energizing circuit of the relay 413 short-circuits the relay 412.

The relay 400, upon being energized, opens the locking circuit of the relay 401 at armature 421, opens the circuit of the relay 417 at this same armature, prepares a locking circuit for itself at armature 420, and prepares a circuit for the relay 418 at armature 419. The relay 417, upon being deenergized, opens another point in the circuit of the relay 208 at armature 459. The relay 401, upon being deenergized, opens another point in the circuit of the relay 111 at armature 426, opens another point in the circuit of the relay 417 at armature 425, and completes a circuit at armature 423 for maintaining the relay 400 energized and for energizing the relay 418. The relay 418, upon being energized, prepares a circuit for the relay 208.

Another result of the operation of the relay 400 is that a circuit is completed extending from ground by way of armature 447 and its back contact, armature 422 and its front contact, conductor 19, front contact and armature 149, armature 174 and its back contact, winding of relay 124, back contact and armature 153, and back contact and armature 180 to battery. The relay 124, upon being operated, opens the circuit of the selecting relay 309 at armature 176, at the front contact of this armature completes a circuit extending from ground by way of armature 178 and its back contact, armature 176 and its front contact, winding of relay 123, winding of relay 124, back contact and armature 153, and back contact and armature 180 to battery. The relay 123 is not energized over this circuit by reason of the fact that it is short-circuited as long as the original energizing circuit of the relay 124 remains completed.

The selecting relay 309, upon being deenergized, opens the circuits of the relays 315 and 316, thus extinguishing the supervisory lamps 318 and 319, and removes ground from the conductor 16, thereby opening the circuit of the relay 206. The relay 206 is deenergized to open the circuit of the relay 207 and to open the original energizing circuit of the relay 204.

The relay 207, upon being deenergized, completes a circuit extending from ground by way of armature 240 and its back contact, winding of relay 208, conductor 273, armature 460 and its front contact, and back contact and armature 459 to battery. The relay 208 immediately operates to open one point in the control circuit, thereby permitting the relay 411 to be deenergized.

As a result of the deenergization of the relay 411, the short-circuit is removed from the relay 412 and this relay is permitted to energize. As a result of the operation of the relay 412, one point in the circuit of the relay 411 is opened at armature 449, another point in the original energizing circuit of the relay 413 is opened at armature 448, and the short-circuit around the winding of the relay 123 is opened at armature 447.

The relay 123 immediately operates to prepare a circuit for the counting relay 110 at armature 173, to open one point in the original energizing circuit of the relay 124 at armature 174, and to complete a circuit at armature 175 extending from ground by way of armature 178 and its back contact, armature 148 and its back contact, armature 175 and its front contact, conductor 33, spring 381 and its working contact, and winding of relay 308 to battery. The selecting relay 308 is energized over this circuit and operates to prepare certain signalling circuits at the springs 362 and 363 and their working contacts, and at the spring 361 and its working contact to prepare a circuit for the relay 205.

The conductor 373 extends from the resting contact of the spring 398 of the key K—11 to a set of relays associated with a key that is accessible to this particular selecting relay in the same manner as the conductor 399 extends to the springs of key K—10 and to the relays associated with the key K—1 over the conductor 14. In a like manner, the conductors extending to all the keys K—3 to K—9, inclusive, extend to similar relays associated with the keys accessible to the selecting relays 300 to 306, inclusive. This means that the conductors, such as 399 and 373 have ground placed upon them normally as long as the dispatcher does not desire to control an operation at the substation. The relays 201, 220, 202 and 221 are responsive to supervisory signals to indicate any changes of power mechanism. If there has been a change of power mechanism, movement of the key K—1 will remove ground from line 14. As a result, the position of the key does not agree with the power mechanism, as shown by the position of the relays. Until the power mechanism changes and, consequently, affects the relays, there will be no ground on 14. Similarly, if the power mechanism changes its condition and affects the relays, ground will be removed from conductor 14 with the key K—1 in the position shown, because, under these conditions, the position of the key does not agree with the setting of the power mechanism.

It will be noted that, by arranging the stop contacts of key K—1 and key K—14 in series, movement of either key into disagreement with the condition of its apparatus unit will disconnect ground from conductor 14 and so prevent further operation of the relay chain when these units are reached. The selecting apparatus will be held in this position until both keys agree with their individual apparatus. As it has been assumed that only the key K—1 has been operated, ground will be present upon the conductor 373 by reason of the condition of the key such as K—11. This ground extends by way of the working contact of spring 361 and said spring, conductor 15, and winding of relay 205 to battery.

The relay 205 is energized over the above circuit and operates to complete a circuit, at armature 290, for the relay 203. Another result of the operation of the relay 205 is that, at armatures 236 and 237, a circuit is completed extending from ground by way of front contact and armature 242, armature 237 and its front contact, back contact and armature 239, winding of relay 207, armature 238 and its back contact, armature 236 and its front contact to battery. The relay 207 operates to establish a locking circuit for itself at armature 240 and to open the circuit of the relay 208 at this same armature.

The relay 203, upon being energized, operates to open the locking circuit of the relay 204 at armature 230, to prepare a locking circuit for itself at armature 231, and to open the circuit of the relay 410 at armature 232. The relay 204 is deenergized to complete a locking circuit for the relay 203 and to open another point in the circuit of the relay 410. The relay 410 is deenergized to disconnect the line relay 411 and to prepare a circuit for connecting the line relay 414 to the trunk conductor 272. The relay 208, upon being deenergized, opens the original energizing circuit of the relay 207 at armature 242, and at armature 241 reestablishes one point in the trunk circuit.

At the substation, the relay 616, upon operating, completes a circuit for the relay 614 and also for the relay 600. The relay 614 operates to open the circuit of the relay 618 at armature 651 and to prepare a circuit at armature 652 for the relay 615. The relays 617 and 618 are deenergized to prepare one point in the circuit of the line relay 619 at armature 661, to prepare a circuit for the relay 617 at armature 660, and to complete a circuit extending from ground by way of armature 798 and its back contact, conductor 828, armature 857 and its back contact, armature 652 and its front contact, winding of relay 615 and winding of relay 614 to battery. This circuit is not effective until the original energizing circuit of the relay 615 is opened.

The relay 600, upon being operated, prepares a locking circuit for itself at armature 623, opens the locking circuit of the relay 601 at armature 624, opens the circuit of the relay 613 at this armature, prepares a circuit for the relay 612 at armature 622, and completes a circuit extending from ground by way of back contact and armature 691, front contact and armature 621, conductor 823, front contact and armature 735, armature 760 and its back contact, winding of relay 712, back contact and armature 779, and back contact and armature 794 to battery. By the deenergization of the relay 601, a locking circuit is established for the relay 600 and a circuit is completed for the relay 612 from ground, battery, relay 612, armatures 622 and 620, line 628 to ground.

The relay 613, upon being deenergized, prepares one point in the circuit of the relay 611. The relay 612 operates to prepare another point in the circuit of the relay 611. The relay 712, upon being energized, opens the circuit of the selecting relay 500 at armature 758, and at the front contact of this armature completes a circuit which extends from ground by way of armature 797 and its back contact, armature 758 and its front contact, winding of relay 713, winding of relay 712, back contact and armature 779, and back contact and armature 794 to battery. The relay 713 is not energized until the original circuit for the relay 712 is opened.

The selecting relay 500, upon retracting its armature, removes ground from the conductor 804 by the operation of the spring 521, disengaging its working contact. The removal of ground from conductor 804 permits the relay 900 to be deenergized. The relay 900 retracts its armature to open the circuit of the relay 610 at armature 928. The relay 610, upon being deenergized, completes a circuit extending from ground by way of armature 646 and its back contact, winding of relay 611, armature 650 and its back contact, and front contact and armature 649 to battery. The relay 611 is energized to open the circuit of the line relay 616 at 647. The relay 616 is deenergized to remove the short-circuit from the relay 615.

The relay 615 is immediately operated to open another point in the circuit of the relay 616 and to remove the short-circuit from the winding of the relay 713, thereby permitting this relay to attract its armatures. As a result of this operation, another point in the original energizing circuit of the relay 712 is opened at armature 760, a circuit is prepared for the relay 702 at armature 759, and at armature 761 a circuit is completed extending from ground by way of armature 797 and its back contact, armature 738 and its back contact, armature 761 and its front contact, conductor 815, spring 575 and its working contact, and winding of second selecting relay 501 to battery. The relay 501 is energized to prepare certain signalling circuits.

In the event that no operation is to take place in connection with this particular apparatus unit that is associated with the selecting relay 501, no signalling current will flow over the conductor 393 and there will be ground present upon the conductor 851. The conductor 851 extends to ground through the signalling relays and individual apparatus associated with the particular circuit breaker that is accessible to the selecting relay 500 in the same manner as the conductor 850 extends to ground. For reasons to be described, the conductor 851 will be grounded unless the condition of the apparatus unit associated with this selecting relay has been changed without having sent an indication to the dispatcher's office. By this ground, a circuit is completed extending from ground by way of the working contact of spring 526 and said spring, conductor 803, and winding of relay 901 to battery.

The relay 901, upon being energized, completes a circuit for the relay 903 at armature 991, prepares a locking circuit for the relay 610 at armature 930, and at armature 931 a circuit is completed extending from ground by way of front contact and armature 648, conductor 832, armature 929 and its back contact, front contact and armature 931, conductor 833, winding of relay 610, conductor 831, armature 928 and its back contact, and front contact and armature 930 to battery. The relay 610 is immediately operated to establish a locking circuit for itself at armature 646 and, at this same armature, to open the circuit of the relay 611, thereby permitting this relay to retract its armatures. The relay 611, upon retracting its armature 647, opens one point in the circuit of the relay 619 and, at armature 648, opens one point in the original energizing circuit of the relay 610.

The relays 414 and 619 are now energized in series. At the dispatcher's office, the relay 414, upon being energized, completes a circuit for the relay 401 and for the relay 416 from ground, armatures 453 and 455, relay 416, battery to ground. The relay 416 operates to open the circuits of the relays 412 and 413 at armature 457 and to complete a circuit for the relay 415. This last mentioned circuit is not effective until the original circuit for the relay 416 is opened by the deenergization of the relay 414. The relay 401, upon operating, opens the circuit of the relay 400 and also of the relay 418. In addition, the relay 401 prepares a locking circuit for itself and prepares a circuit for the relay 417. The relay 400, upon being deenergized, establishes the locking circuit of the relay 401 and completes the circuit of the relay 417. The relay 418 is deenergized to prepare a point in the circuit of the relay 208 and the relay 417 is energized for the same purpose.

Another result of the energization of the relay 401 is that a circuit is established for the relay 110. The relay 110 operates to complete a circuit for the relay 109 that is not effective until the original circuit for the relay 110 is opened. Another result of the operation of the relay 110 is that the circuit of the second selecting relay 308 is opened and this relay is deenergized to disconnect certain signalling circuits and to remove ground from the conductor 15, thereby permitting the relay 205 to be deenergized, to open the circuit of the relay 207.

The relay 207 retracts its armature to complete a circuit for the relay 208. The relay 208 operates to prepare a circuit for the relay 207 and to open the trunk circuit, that is, the circuit of the line relay 414. The relay 414 is deenergized to permit the operation of the relay 415 and to open another point in the circuit of the relay 401. The relay 415 operates to remove the short-circuit from the winding of the relay 109. The relay 109 operates to prepare a circuit for the relay 122 at armature 145, opens another point in the original energizing circuit of the relay 110 at armature 146, and at armature 147 completes a circuit for the third selecting relay 307. The relay 307 operates to prepare certain signalling circuits. The relay 206 is not energized by reason of the fact that no ground is present on the conductor 399, it having been removed from the conductor 14 by the release of the key K—1. The conductor 14 is grounded when 268 closes its upper contact, 224 being at its upper position. Since K—1 has been moved to open the contact of 268, ground is not present on 14.

At the substation, the relay 619 operates to complete a circuit for the relay 617 and also for the relay 601. The relay 617 is energized to open the circuit of the relays 614 and 615 and to complete a circuit for the relay 618 that is effective upon the deenergization of the relay 619. The relay 601 operates to open the circuit of the relay 600 and also that of the relay 612, to prepare a locking circuit for itself, and to prepare a circuit for the relay 613. The relay 600, upon being energized, completes a circuit for the relay 613 and a locking circuit for the relay 601 at armature 624. The relay 612 deenergizes to prepare a point in the circuit of the relay 611. The relay 613 is energized to perform a similar function.

Another result of the operation of the relay 601 is that a circuit is completed for the counting relay 702. The counting relay 702 operates to open the circuit of the selecting relay 501 at armature 738, and to complete a circuit for the relay 703 which is effective when the original circuit for the relay 702 is opened. The relay 501 is deenergized to restore certain signalling circuits to normal and to remove ground from conductor 803. The removal of ground from the conductor 803 permits the relay 901 to be deenergized.

The relay 901 retracts its armature to open the circuit of the relay 610. The relay 610 is deenergized to complete a circuit for the relay 611 over a path extending from battery by way of armature 649 and its back contact, front contact and armature 650, winding of relay 611, and back contact and armature 646 to ground. The relay 611 immediately operates to prepare a circuit for the relay 610 and to open the circuit of the relay 619. The relay 619 is deenergized to remove the short-circuit from the relay 618.

The relay 618 operates to open one point in the circuit of the line relay 619 and to remove the short-circuit from the winding of the relay 703, thereby permitting this relay to be energized. The relay 703 operates to prepare a circuit for the relay 714 at armature 739, at armature 740 to open another point in the original energizing circuit of the relay 702, and at armature 741 to complete a circuit extending from ground by way of back contact and armature 797, armature 762 and its back contact, armature 741 and its front contact, conductor 814, spring 576 and its working contact, and winding of relay 502 to battery. The selecting relay 502 operates to prepare certain signalling circuits and to prepare a circuit for the relay 900.

Inasmuch as the control key K—2 at the dispatcher's office is depressed at this time, there will be a circuit completed extending from the ungrounded pole of the 42 cycle generator G—1 by way of spring 291 and its working contact, spring 267 and its resting contact, front contact and armature 225, conductor 13, spring 357 and its working contact, conductor 45, contact 185 of key K, operating trunk conductor 393, and windings of the mechanically tuned relays 726, 729 and 731 in multiple to ground. As the relay 731 is tuned to this particular frequency of alternating current, the armature 792 will respond and a circuit will be completed extending from ground by way of spring 730, springs 793 and 727, and winding of relay 724 to battery.

The relay 724, upon operating, at armature 782 removes ground from the common conductor 826 which extends through the contacts of individual relays associated with each circuit breaker and thence to conductors, similar to conductor 800, extending to the selecting relays. Another result of the operation of the relay 724 is that, at armature 783, a circuit is completed extending from ground by way of armature 786 and its back contact, armature 783 and its front contact, conductor 801, working contact of spring 528 and said spring, conductor 818, and winding of relay 925 to battery.

The relay 925 operates to complete a circuit for the closing coil 926 of the circuit breaker C. The closing coil operates the circuit breaker. The low-resistance relay 922 is energized in circuit with the closing coil 926 and operates to complete a circuit extending from ground by way of front contact and armature 982, armature 970 and its front contact, and winding of relay 915 to battery. The relay 915 is operated to complete a circuit for the relay 916, although this circuit is not effective until the original circuit of the relay 915 is opened.

When the circuit breaker C is operated, the circuit of the relay 922 is opened by the movement of 987 momentarily opening its contacts, and this relay is deenergized to permit the relay 916 to be completely operated. The relay 916 prepares a starting circuit at armature 968 and, at armature 967, prepares a circuit for the relay 914.

It may happen that, before the harmonic relay 731 is operated to energize the relay 724, the ground present upon the conductor 804 will cause the momentary operation of the relay 900. The relay 900 is then immediately operated to cause the energization of the relay 610. The relay 610 is energized to establish a locking circuit for itself and to cause the deenergization of the relay 611. The relay 611 opens the original energizing circuit of the relay 610 and prepares a circuit for the line relay 616.

The relay 902, having been operated in the meantime, causes the release of the relay 903 and completes a circuit for the relay 620. The relay 620 operates to prepare a circuit for the line relay 616. When the relay 900 is deenergized by the operation of the relay 502, the locking circuit of the relay 610 is opened and this relay is deenergized to again establish a circuit for the relay 611, and another point in the trunk circuit is opened. Thus, the relay chains remain in this particular position until after the operation of the relay 724. The apparatus which effects the synchronous selection is in this way prevented from further operation until the control of the circuit breaker C has been accomplished. The relay 724 is sufficiently slow to release so that it does not retract its armature during the vibration of the spring 730 between the contacts 793 and 727.

Another result of the operation of the circuit breaker C is that, at the switch 986, a circuit is completed for the relay 905. The relay 905 is immediately operated to complete a circuit extending from ground by way of armature 942 and its front contact, armature 944 and its back contact, armature 956 and its back contact, and winding of relay 908 to battery. The relay 908 is operated over the above circuit and opens another point in the circuit by which the conductor 800 is grounded, at armature 947, and at armature 946 establishes a circuit for maintaining the relay 908 energized.

Another result of the operation of the relay 908 is that a circuit is completed at armature 951 for the relay 906, one point in the circuit of the relay 910 is opened at armature 950, and at armature 949 a signalling circuit is completed. The relay 906, upon being energized, establishes a locking circuit for itself at armature 943, at armature 944 opens one point in the circuit of the relay 908, and at armature 945 prepares a circuit for the relay 910.

The previously mentioned signalling circuit may be traced from ground through the winding of relay 907, front contact and armature 949, conductor 816, spring 529 and its working contact, conductor 895, armature 939 and its back contact, trunk conductor 394, spring 186 and its resting contact, conductor 46, working contact of spring 358 and said spring, conductor 35, armature 222 and its back contact, and winding of relay 221 to battery. The relay 221 operates to attract the armature 229, thereby permitting the armatures 227 and 228 to restore, and at armature 294 to complete a circuit for the relay 220 from ground, battery, armature 294, relay 220, 269 and its contact to ground. The restoration of the armature 227 causes the signalling lamp 281 to be extinguished and the lamp 280 to be lighted.

The operation of the armature 228 completes a circuit for the relay 200. The relay 200 operates to connect the relay 202 to the signalling conductor 35 and opens the circuit of the relay 221, which is deenergized. The operation of the relay 220 causes the armature 226 to permit the armatures 224 and 225 to be released. By the release of the armature 225, the previously mentioned signalling circuit from the generator G—1 is opened, while, by the operation of the armature 224, ground is replaced upon the conductor 14.

Similarly, the relays 282 to 286 are responsive to supervisory signals over other contacts of the selecting relay 307 to control the grounding of conductor 14 when the key K—14 is in agreement with the individual apparatus unit. It will be understood, of course, that the supervisory receiving relays 282 to 286 and the control contacts of the key K—14 are connected through contacts of selecting relay 307 to an additional pair of control and supervisory conductors 395 and 396.

The relay 907 is energized in series with the relay 221. The relay 907, upon being energized, opens the circuit of the relay 908, thereby permitting this relay to be deenergized, and prepares a circuit for placing ground upon the conductor 800. By the deenergization of the relay 908, the armatures 946 and 947 are held in their operated positions. The retraction of the armature 949 opens the circuit of the relay 907, while the retraction of the armature 950 prepares a circuit for the relay 910. The retraction of the armature 951 opens the original energizing circuit of the relay 906.

When ground is placed upon the conductor 14 by the operation of the armature 224 of the relay 201, a circuit is completed extending from said ground conductor 399, working contact of spring 356 and said spring, conductor 16, and winding of relay 206 to battery. The relay 206 is energized to complete a circuit for the relay 204 at armature 291, and to complete a circuit for the relay 207 at armatures 238 and 239. The circuit for the relay 207 extends from ground by way of the front contact and armature 242, armature 237 and its back contact, front contact and armature 239, winding of relay 207, armature 238 and its front contact, and back contact and armature 236 to battery.

The relay 207 operates to establish a locking circuit for itself at armature 240 and to open the circuit of the relay 208 at this armature. The relay 208 is deenergized to complete a point in the control circuit and to open the original energizing circuit of the relay 207. The relay 204, upon being energized, establishes a locking circuit for itself at armature 234, at armature 233 opens the locking circuit of the relay 203, and at armature 235 prepares a circuit for the relay 410. The relay 203, upon being deenergized, completes a locking circuit for the relay 204 and establishes a circuit extending from ground by way of armature 232 and its back contact, front contact and armature 235, conductor 274, and winding of relay 410 to battery. The relay 410 is operated to disconnect the relay 414 from the trunk circuit and to prepare a circuit for the line relay 411.

At the substation, when the relay 724 is released by reason of the cessation of the vibration of the armature 730 of the relay 731, ground is placed upon the conductor 800. It will be seen that the relay 724 is not deenergized until the relay 731 has ceased to operate. This provision is made in order to insure that the relay 731 will not be energized when another apparatus unit is selected.

At this point, attention is also directed to the fact that, should the harmonic relays 729 and 731 be out of adjustment, or should an intermediate frequency be applied to the signalling circuit due either to harmonics from G—1, G—2 and G, and other sources, both these relays will operate. As a result of this action, no operation will take place at all, as the circuits for relays 924 and 925 are opened at armatures 786 and 784 when both relays are energized. Thus, as the dispatcher receives no signal that the desired circuit breaker, or other apparatus unit, has been operated, he will know that there is trouble in the circuit.

Now, when ground is replaced upon the conductor 800, the relay 900 is operated to complete the circuit of the relay 610. The relay 610 is energized to open the circuit of the relay 611, whereby the trunk or control circuit is completed. This circuit may be traced from ground by way of back contact and armature 449, winding of relay 411, front contact and armature 444, conductor 278, front contact and armature 265, armature 241 and its back contact, trunk conductor 272, armature 647 and its back contact, conductor 838, armature 958 and its front contact, conductor 839, armature 664 and its front contact, winding of relay 616, and armature 654 and its back contact to battery. The relays 411 and 616 are operated over this circuit.

The operation will now proceed in substantially the same manner as has been described hereinbefore. That is, by the operation of the control circuit, the relays 122 and 121, 108 and 107, 120 and 119, 106 and 105, 118 and 117, 104 and 103, 116 and 115 and 102 and 101 are energized in the sequence mentioned. The selecting relays 306, 305, 304, 303, 302, 301 and 300 are energized in substantially the same manner as before described.

The circuit for the relay 102 is completed by the operation of the line relay 414, causing the energization of the relay 401. The relay 102, upon operating, opens the circuit of the selecting relay 300 at armature 132, and at the front contact of this armature completes a circuit for the relay 101, which is effective when the circuit for the relay 102 is opened.

The relay 300, upon being deenergized, opens certain signalling circuits and also removes ground from the conductor 15. The removal of ground from the conductor 15 permits the relay 205 to be deenergized. This relay retracts its armatures 236 and 237, thereby opening the circuit of the relay 207. The relay 207 is deenergized to complete a circuit for the relay 208. The relay 208 operates to open one point in the control circuit at armature 241 and to prepare a circuit for the relay 207 at armature 242.

The opening of the control circuit causes the deenergization of the line relay 414 and the consequent operation of the relay 415. The relay 415 operates to remove the short-circuit from the winding of the relay 101 and this relay is energized to prepare a circuit for the relay 114 at armature 129, to open one point in the original energizing circuit for the relay 102 at armature 130 and to complete a circuit extending from ground by way of armature 178 and its back contact, armature 156 and its back contact, armature 131 and its front contact, conductor 24, and winding of relay 313 to battery. The relay 313 is energized over the above circuit and operates to place ground upon the conductor 16 at armature 387, and to complete a circuit extending from ground by way of armature 388 and its front contact, conductor 463, armature 440 and its back contact, winding of relay 409, back contact and armature 433 and back contact and armature 431 to battery.

The relay 409 operates to open the circuit of the relay 310 at armature 442 and to place ground upon the conductor 277 at the front contact of this armature. As a result of the deenergization of the relay 310, the first group of selecting relays is disassociated from the control of the counting relays. Another result of the operation of the relay 409 is that a circuit is completed extending from ground by way of armature 428 and its back contact, armature 443 and its front contact, winding of relay 408, winding of relay 409, back contact and armature 433 and back contact and armature 431 to battery. The relay 408 is not energized as long as the original circuit for the relay 409 remains closed.

The grounding of conductor 16 causes the energization of the relay 206 and the consequent operation of the relays 204 and 207. The relay 204, upon being energized, opens the circuit of the relay 203 at armature 233, establishes a locking circuit for itself at armature 234, and completes a circuit for the relay 410 at armature 235. The relay 207, upon being energized, establishes a locking circuit for itself at armature 240 and opens the circuit of the relay 208 at the back contact of this armature. The relay 208 is deenergized to prepare a circuit for the line relay 411.

At the substation, the relays 714 and 715, 704 and 705, 716 and 717, 706 and 707, 718 and 719, 708 and 709, 720 and 721, 710 and 711 are energized in the sequence mentioned by the operation of the two line relays under the control of the control circuit. The switching relays 503 to 509, inclusive, are energized in a manner similar to that already described. The operation of the selecting relays at the dispatcher's office and at the substation takes place simultaneously, that is, the corresponding selecting relays at both the dispatcher's office and the substation are energized together. The signalling circuits function in identically the same manner as before described.

The relay 710 is operated by the energization of the line relay 619, causing the operation of the relay 601. Upon operating, the relay 710 opens the circuit of the selecting relay 509 at armature 554, and at the front contact of this armature a circuit is completed extending from ground by way of armature 797 and its back contact, armature 754 and its front contact, winding of relay 711, winding of relay 710, back contact and armature 779 and back contact and armature 794 to battery. This circuit is not effective until the original energizing circuit of the relay 710 is opened.

The deenergization of the relay 509 removes ground from conductor 803, thus permitting the relay 901 to be deenergized. The release of the relay 901 causes the release of the relay 610 and the consequent energization of the relay 611. Upon operating, the relay 611 opens one point in the circuit of the line relay 619 and prepares a circuit for the relay 610. The relay 619, upon being deenergized, permits the relay 618 to operate, thereby removing the short-circuit from the winding of the relay 711 to permit this relay to operate. The relay 711, upon being energized, prepares a circuit for the relay 722 at armature 755, and at armature 757 completes a circuit extending from ground by way of armature 797 and its back contact, armature 778 and its back contact, armature 757 and its front contact, conductor 806, and winding of relay 513 to battery.

The relay 513 is energized to place ground upon the conductor 804 at armature 570 and to complete a circuit, at armature 571, extending from ground by way of said armature and its front contact, conductor 821, armature 642 and its back contact, winding of relay 609, back contact and armature 635, and back contact and armature 633 to battery. The relay 609 is energized over this circuit and operates to open the circuit of the switching relay 516 at armature 644, and to complete a circuit extending from ground by way of armature 629 and its back contact, armature 645 and its front contact, winding of relay 608, winding of relay 609, back contact and armature 635, and back contact and armature 633 to battery. This circuit is not effective, however, until the original circuit for the relay 609 is opened. The switching relay 516 is deenergized to disassociate the selecting relays 500 to 509, inclusive, from the counting relay chain.

The grounding of conductor 804 causes the relay 900 to be energized whereupon the relay 900 operates to complete a circuit at armature 990 for relay 902 and a circuit at armatures 928 and 929 for the relay 610. The relay 902, upon being operated, opens the locking circuit of the relay 903 at armature 932, establishes a locking circuit for itself at armature 933, and at armature 934 prepares a circuit that is effective upon the deenergization of the relay 903. This circuit extends from ground by way of armature 937 and its back contact, front contact and armature 934, conductor 835, and winding of relay 620 to battery.

The relay 620 is operated to prepare a circuit for the line relay 616. The relay 610, upon being energized, opens the circuit of the relay 611 at armature 646, and at the front contact of this armature establishes a locking circuit for itself. The relay 611, upon being deenergized, completes a point in the trunk circuit and opens the original circuit of the relay 610 at armature 648. A circuit is now completed for the line relays 411 and 616 in series.

The relay 411 operates to complete a circuit for the relay 413 at armature 445 and also a circuit for the relay 400 at armature 446. The relay 413 operates to prepare a circuit for the relay 412. The relay 400, upon operating, opens the locking circuit of the relay 401, and also the circuit of the relay 417, at armature 421, prepares a locking circuit for itself at armature 420, and prepares a circuit of the relay 418 at armature 419. The relay 401 is deenergized to complete a locking circuit for the relay 400 and also a circuit for the relay 418. The relay 418 attracts its armature to prepare a circuit for the relay 208. The relay 417 retracts its armature for the same purpose.

Another result of the operation of the relay 400 is that a circuit is completed for the counting relay 114. The counting relay 114 is operated to open the circuit of the relay 313 at armature 156, and to establish a circuit for the relay 113 at the front contact of this armature. The relay 113 is not energized until the original energizing circuit of the relay 114 is opened.

The relay 313, upon being deenergized, removes ground from the conductor 16, thereby permitting the relay 206 to be deenergized. Another result of the release of the switching relay 313 is that the short-circuit is removed from the winding of the relay 408 and this relay is permitted to be energized. The relay 408 operates to prepare a circuit for the relay 407 and to complete a circuit extending from ground by way of front contact and armature 251, conductor 276, back contact and armature 429, armature 441 and its front contact, back contact and armature 438, conductor 462, and winding of switching relay 311 to battery. The switching relay 311 is energized to place the second group of selecting relays under the control of the counting relays.

As a result of the deenergization of relay 206, the relay 207 is deenergized to complete a circuit for the relay 208. The relay 208 operates to prepare a circuit for the relay 207 at armature 242 and opens one point in the trunk circuit at armature 241, thereby permitting the relay 411 to be deenergized, thus removing the short-circuit from the relay 412. The relay 412 is energized to remove the short-circuit from the relay 113, thereby permitting this relay to be energized.

The relay 113, upon operating, completes a circuit extending from ground by way of armature 177 and its back contact, armature 155 and its front contact, conductor 23, winding of relay 314 and to battery. The relay 314 is energized over the above circuit to place ground upon the conductor 15, thereby completing a circuit for the relay 205. The relay 205 operates, at armature 290, to complete a circuit for the relay 203, and at armatures 236 and 237 to complete a circuit for the relay 207. The relay 203 operates to open the locking circuit of the relay 204 at armature 230 and to open the circuit of the relay 410 at armature 232. The relay 410 is deenergized to prepare a circuit for the line relay 414. The relay 207 operates to open the circuit of the relay 208. The relay 208 is deenergized to prepare one point in the trunk circuit.

Other results of the operation of the relay 113 are that the original energizing circuit of the relay 114 is opened at armature 154, and at armature 153 a short-circuit is removed from the relay 126. The relay 126 is energized to complete a circuit for the slow release relay 125 at armature 181. The relay 125 is energized after an interval of time to remove ground from the conductor 11, thereby opening the circuit of the relays 412 and 413 at armature 179, and at the front contact of this armature to place ground upon the conductor 10. The operation of the armature 177 opens the circuit of the relay 314, thereby permitting this relay to be deenergized, while the operation of the armature 178 opens the locking circuits of the counting relays 101 to 124, inclusive. In this manner, the counting relays are released, as is the relay 126.

The relay 314 is deenergized to remove ground from conductor 15, thereby permitting the relay 205 to be deenergized to open the circuit of the relay 207. The removal of ground from the conductor 11 by the operation of the armature 179 on the relay 125 causes the locking circuit of the relay 400 to be opened and this relay is deenergized, as is the relay 417. The grounding of conductor 10 completes a circuit for the relay 209. The relay 209, upon being energized, establishes a locking circuit for itself at armature 243, at armature 244 opens one point in the circuit of the relay 212, and at armature 245 opens the circuit of the relay 219. The relay 219 is deenergized to reestablish a point in the original trunk circuit.

At the substation the operation of the relay 616 completes a circuit for the relay 600 and also for the relay 614. The relay 614 operates to prepare a circuit for the relay 615 and to open the circuits of the relays 617 and 618. The deenergization of these relays restores certain circuits to normal. The relay 600, upon being energized, opens the circuit of the relay 613 and also the locking circuit of the relay 601 at armature 624, prepares a locking circuit for itself at armature 623, and also a circuit for the relay 612 at armature 622.

The relay 613 is deenergized to prepare a circuit for the relay 611 and the relay 601 is deenergized to close a circuit for the relay 612, and the relay 612 operates to prepare another point in the circuit of the relay 611.

Another result of the operation of the relay 600 is that a circuit is completed for the counting relay 722. The relay 722 operates to open the circuit of the relay 513 at armature 778, and to complete a circuit for the relay 723 at the front contact of this armature. The relay 723 is not operated at this time, as its winding is short-circuited as long as the original energizing circuit of the relay 722 is completed.

The relay 513, upon being deenergized, removes ground from the conductor 804 and also removes the short-circuit from the winding of the relay 608. The relay 608 immediately operates to prepare a circuit for the relay 607 at armature 642 and to complete a circuit extending from ground by way of front contact and armature 969, conductor 837, back contact and armature 631, armature 643 and its front contact, back contact and armature 640, conductor 820, and winding of switching relay 515 to battery. By the operation of the switching relay 515, the second selecting relay group is associated with the counting relay chain.

The removal of ground from the conductor 804 causes the deenergization of the relay 900 and the consequent release of the relay 610. By this operation, a circuit is completed for the relay 611 which operates to open the circuit of the line relay 616 at armature 647 and to prepare a circuit for the relay 610 at armature 648. The relay 616 is deenergized to remove the short-circuit from the relay 615, thereby allowing this relay to operate. The relay 615 operates to remove the short-circuit from the winding of the relay 723, thereby allowing this relay to operate.

The relay 723, upon operating, completes a circuit at armature 781 extending from ground by way of armature 796 and its back contact, armature 781 and its front contact, conductor 805, and winding of relay 512 to battery. The relay 512 is energized to place ground upon the conductor 803. By the grounding of conductor 803, the relay 901 is energized to cause the operation of the relay 903 and also the operation of the relay 610. By the energization of the relay 903, the relay 902 is released and the relay 620 is deenergized. The relay 610, upon being energized, opens the circuit of the relay 611, thereby preparing another point in the trunk circuit.

Other results of the operation of the relay 723 are that at armature 780 the original circuit of the relay 722 is opened, and at armature 779 the short-circuit is removed from the winding of the relay 732. The relay 732 is now energized over a circuit that extends from battery, winding of relay 732, winding of relay 722, winding of relay 723, front contact and armature 778, and back contact and armature 797 to ground. The circuit for the relay 732 also includes all the windings of the counting relays 700 to 721, inclusive, connected in multiple.

The relay 732 operates to complete a circuit for the relay 733. The relay 733 is energized to open the circuit of the relay 512 at armature 796 and to open the locking circuits of all the counting relays at armature 797. Another result of the energization of the relay 733 is that, at armature 798, ground is removed from the conductor 828 whereby the locking circuit of the relays 614 and 615 are opened and these relays are deenergized. The removal of ground from conductor 828 also causes the release of the relay 600 and the relay 612.

Another result of the operation of the relay 733 is that a circuit is completed extending from ground by way of armature 798 and its front contact, conductor 829, and winding of relay 921 to battery. The relay 921 is energized to establish a locking circuit for itself at armature 979, to open one point in the circuits of the relays 918 and 919 at armature 980, and to open the circuit of the relay 911 at armature 981. The relay 911 is immediately deenergized to restore one portion of the trunk or control circuit to normal.

The relays 218 and 912 are now energized over a circuit that extending from battery by way of armature 250 and its back contact, winding of relay 218, back contact and armature 265, armature 241 and its back contact, trunk conductor 272, armature 647 and its back contact, conductor 838, armature 958 and its back contact, winding of relay 912 and back contact and armature 974 to ground.

The relay 218 operates to open the original energizing circuit of the relay 213 and to complete a circuit for the relay 210. The relay 210 operates to open the locking circuit of the relay 209, which is deenergized.

The deenergization of the relay 209 completes a circuit that extends from ground by way of armature 245 and its back contact, armature 264 and its front contact, and winding of relay 217 to battery. The relay 217 is energized to prepare a circuit for the relay 216 at armature 262 and completes a circuit extending from ground by way of armature 251 and its front contact, conductor 276, back contact and armature 429, armature 442 and its front contact, conductor 277, back contact and armature 296, front contact and armature 261, armature 249 and its back contact, and winding of relay 211 to battery. The relay 211 is energized to prepare a circuit for the relay 212 at armature 247, to prepare a circuit for the relay 216 at armature 248, and to complete a circuit for the relay 298 at armature 295. The relay 298 immediately operates to open the previously traced circuit for the relay 211, thereby removing the short-circuit from the relay 212. The relay 212 operates to open another point in the original energizing circuit of the relay 211 at armature 249, and at armature 250 opens the circuit of the relay 218 and also the circuit of the relay 912.

The relay 912, at the substation, is energized over the previously traced circuit and operates to prepare a circuit for the relay 913 at armature 960, and to complete a circuit for the relay 920 at armature 959. The relay 920 is operated to open the locking circuit of the relay 921 which is deenergized to prepare a circuit for the relay 918 and to complete a circuit for the relay 913. The relay 913 is energized to prepare a point in the circuit of the relay 914 at armature 962, and to complete a circuit that extends from ground by way of front contact and armature 969, conductor 837, back contact and armature 631, armature 644 and its front contact, conductor 834, armature 983 and its back contact, front contact and armature 961, armature 973 and its back contact, and winding of relay 919 to battery.

The relay 919 is energized over the above circuit and operates at armature 977 to prepare another point in the circuit of the relay 914, to prepare a circuit for the relay 918 at armature 976, and to complete a circuit for the relay 923 at armature 975. The relay 923, upon being operated, opens the original energizing circuit of the relay 918, at armature 983, thereby removing the short-circuit from the winding of the relay 918 and permitting this relay to energize. The relay 918, upon being operated, at armature 974 opens one point in the trunk circuit, thereby permitting the relay 912 to be deenergized.

The control circuit now starts to function in the same manner as before to energize the counting relays 102 to 124, inclusive, at the dispatcher's office, in the proper sequence and the relays 700 to 723, inclusive, at the substation, in the same sequence. By the operation of these counting relays, inasmuch as the second switching relays 313 and 515 at the dispatcher's office and substation, respectively, are now energized, the second group of selecting relays are associated with the counting relays in the respective groups. The selecting relays will now be energized under the control of the counting relays in substantially the same manner as before described.

In the event that no circuit breaker operation has taken place at the substation and that the dispatcher has not thrown a control key to operate a circuit breaker or apparatus unit in this particular group, the circuit will operate at high speed and no signalling will occur. In the event that there is an operation performed by either the apparatus unit or the dispatcher, the signalling will take place in a manner similar to that already described.

When the last counting relay is energized at both the substation and the dispatcher's office, the relay 313 at the dispatcher's office will be released and the relay 314 will be energized, while, at the substation, the relay 513 will be released and the relay 512 will be energized. The energization of relay 313 caused the energization of relay 407 over a circuit from battery, armature 431, 407, 436, 440, 463, 388 to ground. Deenergization of relay 313 opens this circuit and 406 and 407 are energized in a series circuit, whereby the switching relay 311 is deenergized and a circuit is prepared for the relay 405. The deenergization of the switching relay 311 disconnects the second group of selecting relays from the control of the counting relays. The grounding of conductor 15 by the operation of the relay 314 causes the circuits to operate in a manner similar to that above described. The operation of the relay 126, which occurs in response to the operation of the counting relay 113, energizes the slow-acting relay 125. By the operation of the relay 125, the counting relays are released, as well as the relays 211, 212, 400, 412, 413 and 418.

At the substation, the operation of the relay 513 causes the energization of the relays 607 and 606 over a circuit from ground, armature 571, 821, 642 and its front contact, 607, 635, 633, battery to ground. The circuit of the switching relay 515 is opened at armature 640. 513 is deenergized and the relays 607 and 606 are energized in series. A starting circuit is prepared and a circuit is prepared for the relay 605. The deenergization of the relay 515 disassociates the second group of selecting relays at the substation from the control of the counting relays. The energization of the relay 512 causes the relay 901 to function and causes the restoration of a portion of the trunk circuit.

The energization of the last switching relay 723 also causes the operation of the relay 732. This relay operates to close a circuit for the relay 733. The relay 733 effects the release of all the counting relays, as well as the relays 614, 615, 600 and 612.

The relays 218 and 912 are now energized and are connected in series with the control circuit. By the energization of these relays, the starting circuit is again completed and, as the third switching relays 312, at the dispatcher's office, and 514, at the substation, are now energized, the operation of the control circuit, in causing the functioning of the counting relays, will control the operation of the third group of selecting relays. The operation of the selecting relays prepares signalling circuits that function only in the event that the dispatcher desires to control a circuit breaker in this particular group, or in the event that an apparatus unit in this group has functioned.

Upon the operation of the last counting relays 101 and 102 and 113 and 114 at the dispatcher's office, the relay 313 is energized and deenergized and the relay 314 is operated. By the operation of the relay 313, a circuit is completed extending from ground by way of armature 388 and its front contact, conductor 463, armature 440 and its front contact, armature 436 and its front contact, armature 432 and its back contact, winding of relay 405, back contact and armature 433, and back contact and armature 431 to battery. The relay 405 is operated to open the circuit of the switching relay 312 at armature 434, and to prepare a circuit for the relay 404 at armature 435.

When the relay 313 is deenergized, the relay 314 is operated and the short-circuit is removed from the relay 403. The relay 403 operates, at armature 430, to complete a circuit for the relay 402. The relay 402 operates to open the locking circuit of the relay 213 at armature 427, to open the circuits of the relays 405 to 409, inclusive, at armature 428, and to open another point in the circuit of the switching relays at armature 429. The relays 404 to 409 inclusive, are released to restore certain circuits to normal. The release of these relays causes the deenergization of the relay 403 and the deenergization of the relay 402.

By the operation of the relay 314, ground is placed on the conductor 15 and the relay 205 is caused to function in the same manner as before. The energization of the counting relay 113 also causes the operation of the relay 126. The relay 126 operates to close the circuit of the relay 125. The relay 125, upon being energized, opens the circuits of all the counting relays, and also of the relay 314. An additional result of the operation of the relay 125 is that certain relays in the control circuit are released. Another result of the operation of the relay 125 is that a circuit is completed for the relay 209. The relay 209 is energized to cause the release of the relays 211 and 212 and also the relay 219.

At the substation, the operation of the last counting relays causes the operation of the relays 513 and 512. The operation of the relay 513 completes a circuit for the relay 605. The relay 605 operates to prepare a circuit for the relay 604. Upon the deenergization of the relay 513, the relay 604 is operated and the relay 603 is permitted to be energized. The relay 603 operates to complete a circuit for the relay 602. The relay 602 is energized to open the locking circuit of the relay 917 at armature 630, to open another point in the circuit of the switching relays at armature 631, and to open the circuits of the relays 603 to 609, inclusive, at armature 629. Relays 604 to 609, inclusive, upon being deenergized, restore certain circuits to normal. Relay 603, upon retracting its armature, opens the circuit of the relay 602, which is deenergized. The relay 917, upon being deenergized, restores certain circuits to normal.

The energization of the last counting relay 723 causes the operation of the relay 732. The relay 732 operates to complete a circuit for the relay 733. The relay 733 operates to release the relay 612 and, also, all the counting relays. Another result of the operation of the relay 733 is that the circuits of the selecting relays that may be operated are opened. In addition, the operation of the relay 733 completes a circuit for the relay 921 and opens the circuits of the relays in the control circuit. The relay 921, upon being energized, opens the circuit of the relay 911 and also the circuit of the relays 918 and 919. The relay 911, upon being deenergized, restores the trunk circuit to normal.

The relays 218 and 912 are now energized in series. The relay 218 operates to complete a circuit for the relay 210. This relay opens the locking circuit of the relay 209 which is deenergized to complete a circuit for the relay 217. The relay 217 operates to prepare a starting circuit.

At the substation, the operation of the relay 912 completes a circuit for the relay 920. The relay 920 operates to open the locking circuit of the relay 921. The relay 921 completes a circuit for the relay 913. The relay 913 prepares certain starting circuits.

The apparatus functions in the above manner when the dispatcher desires to control an apparatus unit at the substation.

Attention is drawn to the fact that it is necessary for the dispatcher to maintain the key K—2 operated in the event that he desires an operation to be performed. The throwing of a key, such as K—1, associated with the predetermined apparatus unit will not cause the operation of such unit unless the key K—2 is operated.

It may be desirable for the dispatcher to cause the apparatus to functon without performing any operation. To do this, he is provided with a checking key K—13. If the apparatus is not functioning when the key K—13 is operated, the relays 211 and 212 will be operated, and the apparatus will function in the same manner as before described. The relay 211 is first energized from ground, K—13, 252, 261, 249 to relay 211 and battery. Opening K—13 opens this circuit to energize 212. The operation thereafter is the same as described.

However, should the apparatus be in operation when the key K—13 is operated, a circuit is completed for the relay 215 from K—13, armature 252 and its front contact, 255 to 215 and battery. The relay 215 operates to complete a circuit for the relay 214. The relay 214 operates to open the original energizing circuit of relay 215 at armature 255, to prepare a circuit for the relay 216 at armature 256, and to prepare a circuit for the relay 211 at armature 257. After the preceding operation has been completed, the locking circuit of the relay 213 is opened and this relay is deenergized. The deenergization of this relay completes a circuit for the relay 211. The relay 211 operates to complete a circuit for the relay 212.

A circuit is now completed extending from ground by way of armature 256 and its front contact, armature 254 and its back contact, front contact and armature 262, front contact and armature 248, armature 259 and its front contact, and winding of relay 216 to battery. The relay 216 is energized to cause the release of the relays 214 and 215. The short-circuit is thus removed from the relay 212 and this relay is energized to cause the apparatus to function in a manner similar to that already described.

It is sometimes desirable to provide the dispatcher with means for releasing all the apparatus at both the dispatcher's office and substation. For this purpose, the dispatcher is provided with a key K. When the key K is operated, one of the signalling conductors 393 is connected to the ungrounded brush of the generator G, while the other signalling conductor 394 is connected to the one terminal of the winding of the relay 127. The generator G generates an alternating current having a frequency of 66 cycles. This current flows over a path which extends from the ungrounded brush of the generator G by way of working contact of spring 185 and said spring, conductor 393, and windings of relays 726, 729 and 731 in multiple to ground. As the armature of the relay 726 is tuned to this particular frequency, ground will be connected by way of spring 789, conductor 825 and winding of relay 904 to battery.

The relay 904 is energized over the above circuit and, upon operating, at armature 940 closes a circuit by way of conductor 830 for the relay 602, completes a circuit at armature 938 for the relay 733, and at armature 939 completes a circuit which extends from ground by way of front contact and said armature, conductor 394, spring 186 and its working contact and winding of relay 127 to battery.

The relay 602, upon being energized, opens the circuits of any relay of the relays 603 to 609, inclusive, that may be operated at armature 629 and, at armature 630, opens the locking circuit of the relay 917 whereby this relay is then deenergized. The relay 916 is deenergized to restore certain circuits to normal. The relay 733, upon being energized, opens the locking circuits of such relays 600, 804, 614, 615, 617, 618, 612 and 613 that may be energized. The grounding of conductor 829 effects the operation of the relay 921 that operates to open the circuit of the relays 918 and 919, which are deenergized. The operation of the relay 921 also opens the circuit of the relay 911. The relay 911 is deenergized to prepare a circuit for the relay 912. In this manner, the apparatus at the substation is restored to normal responsive to the operation of the key K.

At the dispatcher's office, the operation of the relay 127 causes the lighting of the lamp 188. The lighting of this lamp apprises the dispatcher of the release of the apparatus at the substation.

Another result of the operation of the key K is that a circuit is completed for the relay 125 by way of the spring 183 and, also, a circuit is completed by way of the spring 184 for the relay 402. The relay 402 operates to release the relays 403 to 409, inclusive, that are energized at armature 429, and at armature 427 opens the locking circuit of the relay 213. The operation of the relay 125 opens the circuits of any counting relays and selecting relays that are energized, opens the circuits of the relays 614, 615, 617, 618, 612, 613, 600 and 601 that may be energized, and completes a circuit for the relay 209. The relay 209 operates to open the circuit of the relays 211 and 212 and also the circuit of the relay 219. The relay 219 is deenergized to restore one point in the circuit of the relay 218. The apparatus at the dispatcher's office is consequently restored to normal, responsive to the operation of the key K.

When the key K is released, the relay 726 at the substation ceases to operate and the lamp 188 is extinguished.

It is often necessary, as well as desirable, for the dispatcher to be able to select an apparatus unit and maintain connection thereto for some time while he checks and controls its operation and the response of the supervisory signals at the dispatcher's office that are associated with such unit. This feature is also particularly desirable in the event that the dispatcher desires to control an induction regulator of ordinary type to regulate the voltage at the power station or substation, it being possible by this provision, to connect with an induction regulator and control and observe its action, so that the voltage may be raised or lowered to the proper value. The same is, of course, true to current as well as voltage regulators.

However, to provide these operations, the dispatcher is provided with a number of keys, one for each apparatus unit that it is desired to select and maintain connection therewith. These keys are shown as K—3 to K—12, inclusive, in Fig. 3.

In order to describe the operation, it will be assumed that the dispatcher desires to select the circuit breaker C and observe its operation over a period of time. For this purpose, the dispatcher will operate the key K—10 in such direction as to force the spring 391 from its resting contact. By such operation, the connection between the conductor 14 and the conductor 399 is severed.

From the previous description of the operation, it will be remembered that, unless there is ground present upon the conductor 399, the control circuit will pause with the selecting relay 307 energized at the dispatcher's office and the relay 502 energized at the substation. With these relays energized, it will be seen that the signalling conductor 393 extends directly to the mechanically tuned relays. The mechanically tuned relays 729 and 731 are connected directed to the relays 724 and 725 by the operation of the selecting relay 502.

From the above, it will be seen that the dispatcher may, by operating the key K—1 and the control key K—2, control the operation of the circuit breaker C, that is, he may either close or open the circuit breaker, and, by observing the supervisory indications returned in each case, he is apprised of the operation of the apparatus unit.

From the foregoing, it will be obvious that an induction regulator (not shown) may be controlled in a similar manner. Of course, to observe the action of the induction regulator, it will be necessary to have a metering device at the dispatcher's office responsive to the change in voltage or current at the substation. This metering may be accomplished over a separate circuit in any well known manner.

To permit the selecting operation to continue, the dispatcher will operate the key K—10 in the opposite direction to force the spring 374 into engagement with its working contact. As a result of this operation, ground is placed upon the conductor 399 and the relay 206 is operated. The operation then continues in the same manner as before described. The ground is made at spring 374 in order to take care of a condition where the positions of the key and the indicating lamp do not agree with the condition of the power mechanism. That is, under the conditions shown, if spring 268 made contact at its lower position, conductor 14 would not get ground. If, now, it would, for any reason, be desirable to pass over this contact without changing the key position, some other ground circuit would be necessary. This is accomplished at spring 374.

It often occurs that, when the dispatcher operates a circuit breaker from his office, the same will be automatically controlled by current-responsive devices at the station or substation to place it in the same condition as it had been previous to its operation by the dispatcher. In this case, it will be necessary for the dispatcher to receive an indication of such operation by the automatic devices.

To describe this operation, it will be assumed that the dispatcher closes the circuit breaker C in the manner described and that the automatic devices operate by reason of an overload or other condition to trip the circuit breaker immediately after its closure. The operation, so far as the closing of the circuit breaker C is concerned, takes place in substantially the same manner as before described. Inasmuch as the circuit breaker C immediately trips after its operation for the reason above stated, certain circuit conditions are set up which cause the relay selecting apparatus to again function after completing its operation.

In the ordinary operation of the system under the conditions assumed, the selecting apparatus will have been disassociated from connection with the circuit breaker C by the time the circuit breaker trips under automatic control. In the event that the selecting apparatus is not disassociated from the circuit breaker, it will be maintained in connection therewith until the revised indication has been transmitted to the dispatcher's office.

The circuit breaker C is operated by the energization of the relay 924 and its operation completes a circuit for the relay 905. The relay 905 causes the release of the mechanically locked armatures 946 and 947 of the relay 907, whereby an indication is transmitted to the dispatcher's office and signalling that the circuit breaker C has operated, the relay 907 being thereafter operated to again attract its armatures 946 and 947 in which position they are locked.

If the circuit breaker is now released, the relay 905 is deenergized and completes a circuit extending from ground by way of armature 942 and its back contact, front contact and armature 945, armature 950 and its back contact and winding of relay 910 to battery. The relay 910 is operated to attract the armature 954, whereby the armatures 952 and 953 on the relay 909 are released. The release of the armature 952 completes a locking circuit for the relay 910, while the release of the armature 953 removes ground from the conductor 800 whereby the next operation of the control circuit is interrupted temporarily to permit a signal to be sent back to the dispatcher's office. Another result of the operation of the relay 910 is that one point in the circuit of the relay 908 is opened at armature 956, and the locking circuit of the relay 906 is opened at armature 957. The relay 906 is deenergized to open the original energizing circuit of the relay 910.

The restart circuit is prepared in the following manner. When the circuit breaker C is operated by the automatic responsive devices, the common relay 922 is, of course, energized momentarily and a circuit is completed extending from ground by way of the front contact and armature 982, armature 970 and its front contact, armature 966 and its back contact and winding of relay 915 to battery. The relay 915 is energized to prepare a circuit for the relay 916. The relay 916 is operated upon the release of the relay 922. By such operation, a circuit is prepared for the relay 914. When the circuit has functioned, the relay 912 will be energized as will also the relay 913. By the operation of the latter relay, a circuit is completed extending from ground by way of front contact and armature 968, armature 970 and its back contact, front contact and armature 961, armature 973 and its back contact, and winding of relay 919 to battery.

Another result of the operation of the relay 913 is that a circuit is completed extending from ground by way of armature 967 and its front contact, armature 972 and its back contact, front contact and armature 962, front contact and armature 977, armature 965 and its front contact, and winding of relay 914 to battery. The relay 914 operates to open the circuits of the relays 915 and 916. The relay 916 is deenergized to remove the short-circuit from the winding of the relay 918. By the operation of the relay 918, the circuits of the relays 218 and 912 are opened and these relays bring about the reoperation of the apparatus. When the counting chains have so functioned as to cause the operation of the selecting relays 307 and 502, inasmuch as there is no ground present upon the conductor 800, the control circuit is momentarily interrupted.

By the presence of battery through the winding of the relay 909, a circuit is completed extending from battery through the winding of relay 909, armature 955 and its front contact, spring 529 and its working contact, conductor 895, back contact and armature 939, trunk conductor 394, spring 186 and its resting contact, conductor 46, working contact of spring 358 and said spring, conductor 35, armature 222 and its front contact and winding of relay 202 to ground. The relay 202 is energized to open the circuit of the relay 200, to extinguish the lamp 280 and to light the lamp 281. By the change in lamp signals, the dispatcher is apprised of the condition of the circuit breaker C.

The relay 909 is connected in series with the signalling circuit and operates to open the locking circuit of the relay 910 and to prepare a circuit for the signalling line at armatures 952 and 953, respectively. The relay 910 is deenergized to lock the armatures 952 and 953 in their operated positions and to prepare a circuit for the relay 908 at armature 956.

From the above, it will be seen that, if the control circuit does not disassociate the signalling conductors from the relay associated with the key K and from the relays associated with the circuit breaker C before such circuit breaker operates under automatic control, the removal of ground from the conductor 800 in the manner described will prevent the operation of the control circuit until the above-traced signalling circuit is completed and, consequently, the dispatcher will be apprised of the operation of the circuit breaker.

Should the circuit breaker C, or other apparatus unit, be operated automatically at the substation under the control of automatic devices (not shown), the apparatus will function in a manner similar to that described to apprise the dispatcher of such operation, the starting relays 918 and 919 being operated by the momentary operation of the relay 922 in series with the common battery lead to all the apparatus units. The subsequent operations in this case take place in substantially the same manner as before described and need not be explained.

Attention is called to the fact that, if the dispatcher operates the key K—1 to control the operation of the circuit breaker C and does not maintain the control key K—2 operated, the apparatus will pause with the selecting relays 307 and 502 at the dispatcher's office and substation, respectively, energized, by reason of the fact that there is no ground present upon the conductor 14 as the key K—1 is operated. The cessation of the operation of the apparatus will draw the attention of the dispatcher and he may control the operation of the circuit breaker or release the key K—1. Of course, he may also cause the equipment to pass by this point by operating the key K—10 in such direction as to force the spring 374 into engagement with its working contact in a manner before described.

It is possible to double the capacity of the system by adding two extra signalling conductors, such as 395 and 396, or by providing three other switching relays with three additional groups of selecting relays severally at the dispatcher's office and the substation. In this case, the counting relays will control the energization of corresponding relays in the two selecting chains at the dispatcher's office and substation. In this case, two apparatus units or two supervisory signals are selected by the operation of one counting relay. The three spare contacts shown on each of the relays 300 to 309, inclusive, clearly illustrate this feature, one contact making a multiple connection with the keys K—3 to K—12, inclusive, and the other two connecting to lines such as 45 and 46 over keys such as K and line 393 and 394. In this manner, operation at any one of the keys K—3 to K—12, inclusive, will stop the selector relay operation at that point, and the control operation will depend upon whether the key K associated with the first three contacts, or its equivalent key associated with the other three contacts is operated to transmit operating signals. It is, of course, obvious that the three switching relays are merely illustrative, and that any number of switch-over relays can be used with a corresponding increase in the selecting relays.

It is also apparent that the system may be enlarged by providing more switching relays and an additional group of selecting relays for each switching relay provided. When the system is enlarged in this manner, it is necessary to operate the counting relays a plurality of times, depending upon the number of groups of selecting relays. Otherwise, the operation is the same as that before described.

It is obvious that there are other ways in which the system may be enlarged, such as by the addition of control keys and alternating-current generators that generate different frequencies of alternating current. These different frequencies of alternating current could be employed to actuate different mechanically tuned relays at the substation. In the illustration, two frequencies are used. This is sufficient to illustrate the principle of different frequencies with relays tuned to these respective frequencies.

My invention is not limited to the particular arrangement of the apparatus illustrated, but may be variously modified without departing from the spirit and scope of my invention, as set forth in the appended claims.

I claim as my invention:

1. In an electrical control system, the combination with a chain of counting relays, a plurality of switching relays, a group of selecting relays associated with each of said switching relays, the number of selecting relays in each group corresponding in number to the number of counting relays in said chain, means for operating said counting relays in a predetermined sequence a plurality of times, depending upon the number of said switching relays, and means including said switching relays for causing said counting relays to operate selecting relays in a different group during each operation.

2. In an electrical control system, the combination with a plurality of apparatus units, a relay chain switching mechanism for selecting any one of said units, of means for operating said switching mechanism to select a plurality of said units in a predetermined sequence, and means controlled by the condition of certain of said units for interrupting the operation of said switching mechanism.

3. In an electrical control system, the combination with a first station, a second station and apparatus units in said second station, of selecting mechanism including a relay chain operative to select a plurality of said units, means controlled from said first station for operating any one of the selected units, and means operative during such operation to prevent the selecting operation of said switching mechanism.

4. In an electrical control system, the combination with a first station, a second station and apparatus units in said second station, of selecting mechanism at both of said stations, means for operating said selecting mechanism to select said apparatus units in a predetermined sequence, means controlled from said first station for operating any one of the selected units, and means operative to prevent further operation of said selecting mechanism until said unit has operated.

5. In an electrical control system comprising a dispatcher's office, a station, apparatus units in said station and a plurality of signalling devices at said office, the combination with selecting mechanism at both said office and station, of means for operating said selecting mechanism to select said apparatus units in a predetermined sequence, means controlled from said office for operating any one of the selected units, means controlled by the operation of said unit for operating said signalling devices, and means operative to prevent further operation of said selecting mechanism until said signalling devices have been operated.

6. In a signalling system, a first station, a second station, a signalling line connecting said stations, a plurality of apparatus units at said second station, selecting relays individual thereto for selectively connecting said apparatus units to said signalling line, said selecting relays being arranged in groups, and a chain of relays for sequentially energizing and deenergizing said selecting relays, said chain of relays being common to all of said groups of selecting relays.

7. In a signalling system, a group of relays, a second group of relays arranged in pairs, each of said pairs being individual to a relay in said first mentioned group, means responsive to the energization of a relay in one of said pairs for energizing the associated relay in said first group, and means responsive to the energization of the second relay of said pair for deenergizing said relay.

8. In a signalling system, a group of relays, a second group of relays arranged in pairs, each of said pairs being individual to a relay in said first mentioned group, means under the control of said first mentioned group of relays for energizing one of said pairs, means responsive to the energization of said relay for energizing the individual relay of said first mentioned group and for preparing an energizing circuit for the other of said pairs of relays, means responsive to the energization of said relay in said first mentioned group for completing the energizing circuit of said second relay of said pair of relays, and means responsive to the energization of said second relay for deenergizing said relay in said first mentioned group.

9. In a signalling system, a first group of relays, a second group of relays, means controlled by said second group of relays for energizing and deenergizing a relay in said first group and energizing the succeeding relay in said second group, means whereby said energization and deenergization are controlled by the sequential energization of said relays in said second group, and means controlled by the energization and deenergization of said relays in said first group for sequentially energizing said relays in said second group.

10. In a signalling system, a plurality of groups of relays, a second group of relays, means controlled by said second group of relays for energizing and deenergizing a relay in one of said plurality of groups and energizing a succeeding relay in said group, means whereby said energization and deenergization are controlled by the sequential energization of said relays in said second group, and means controlled by the energization and deenergization of said relays in said first mentioned groups for sequentially energizing said relays in said second group, said second group of relays being common to said plurality of groups.

11. In a counting relay chain, the combination with an impulse line of means for applying impulses to said line, a chain of relays, means normally connecting the first relay of the chain to the line whereby it is energized by the first impulse applied to the line, separate means connecting each of the other relays directly to the line through an individual, normally open contact and means responsive to the energization of each relay and the termination of its operating impulse for closing the normally open individual contact for the succeeding relay in the chain.

12. In combination, an impulsing line, a chain of relays, one of which is associated with said line, means for applying an impulse to said impulsing line for energizing said one relay in said chain, the other relays in said chain being at that time disassociated with said impulsing line, relay means individual to each of said relays, means responsive to the termination of each impulse for associating the succeeding relays in said chain with said impulsing line directly over the contact of a relay means individual to the preceding relay in the chain and independent of the contacts of the other relay means.

13. In combination, an impulsing line, a chain of relays associated with said line, said relays being arranged in pairs, means whereby an impulse applied to said line will energize one of the relays of a pair, means responsive to the energization of said relay for conditioning the other relay of said pair for operation, means whereby the termination of the applied impulse to said impulsing line energizes the second relay of said pair and means responsive to the energization of said second relay of said pair for conditioning the first relay of a succeeding pair for energization, said succeeding relay being connected with said impulsing line directly through the contact of said second relay of said first pair, said other relays of said chain being similarly connected so that the first relays of each of said other pairs are connected directly to said impulsing line through the contact of the second of a preceding pair of relays and independent of other contacts of the relays.

14. In combination, an impulsing line, a chain of pairs of relays, means for impressing an impulse on said line for energizing the first relay of the first of said pairs, means responsive to the energization of said first relay for conditioning the other relay of said pair for energization, means for terminating said impulse applied to said impulsing line whereby said second relay is energized, and means responsive to the energization of said second relay of said pair for conditioning the first of the succeeding pair of relays for energization, said relay being connected directly to said impulsing line over the contact of one of the preceding pair of relays, said first relays of each of said pairs being similarly connected directly to said impulsing line over the contacts of the second relay of the preceding pair in the chain.

15. In combination, an impulsing line, means for closing and opening said line, a chain of relays arranged in pairs, means whereby the first relay of each pair is directly connected to said impulsing line over a contact of the second relay of the preceding pair and independent of other contacts, means whereby the second relay of the pair is in turn energized in series with the first relay of its pair following the opening of the closed impulsing line which energized said first relay.

16. In combination, a chain of counting relays, a chain of selecting relays, said counting relays being arranged in pairs, means for energizing said counting relays sequentially, means including circuit connections from said counting to said selecting relays whereby, upon the energization of the first of a pair of said counting relays the selecting relay associated with the preceding pair of counting relays is deenergized and means including circuit connections from said counting relays to said selecting relays whereby, upon the energization of the second of the counting relays, the selecting relay associated with the counting relay is energized.

17. In combination, a chain of counting relays arranged in pairs, a selecting relay individual to each pair of counting relays for energizing said counting relays sequentially, an energizing circuit individual to each of said selecting relays, means including one relay of a pair of said counting relays for closing the individual circuit of the associated selecting relay and means including the other relay of said pair of counting relays for opening the circuit of a selecting relay.

18. In combination, a chain of counting relays arranged in pairs, a selecting relay individual to each pair of counting relays, means for energizing said counting relays sequentially, an energizing circuit individual to each of said selecting relays, means including the second of each pair of counting relays for completing the energizing circuit for its associated selecting relay and means including the first of each pair of counting relays for opening the energizing circuit of the selecting relay associated with the preceding pair of counting relays.

19. In combination, a first station, a second station, a chain of counting relays at each of said stations, arranged in pairs, a selecting relay individual to each pair of counting relays, a drive circuit connecting said stations, means for impressing an impulse on said drive circuit, means responsive to said impulse for energizing one relay of a pair of said counting relays at each of said stations, means for simultaneously opening said drive circuit to deenergize said impulse-responsive means for energizing the second of said pair of said counting relays at each of said stations, means responsive to the energization of said second counting relay at each station for energizing its associated selecting relay, and means at said first station responsive to the energization of said selecting relay thereat, for again closing said drive circuit.

20. In combination, a first station, a second station, a chain of counting relays at each of said stations, arranged in pairs, a selecting relay individual to each pair of counting relays, a drive circuit connecting said stations, means for impressing an impulse on said drive circuit, means responsive to said impulse at each of said stations for energizing a relay of one of said pairs of said counting relays at each of said stations, means for simultaneously opening said drive circuit, means responsive to the opening of said drive circuit for energizing the second of each of said pairs of said counting relays at each of said stations, means responsive to the energization of said second counting relay at each station for energizing its associated selecting relay thereat, means at said first station responsive to the energization of said selecting relay thereat for again closing said drive circut whereby a second impulse is transmitted over said drive line, said impulse-responsive means being responsive to said second impulse for energizing the first of the succeeding pair of counting relays and means responsive to the energization of the first of the succeeding pair of counting relays for opening the energizing circuit of said previously energized selecting relay.

21. In combination, a first station, a second station, a chain of counting relays arranged in pairs at each of said stations, a selecting relay individual to each of said pairs of counting relays at each of said stations, a battery at each station, a drive line connecting said stations, a circuit to the positive side of the battery and a circuit to the negative side of the battery at each of said stations, means for successively connecting said drive line to the positive-polarity circuit at the one station, and to the negative-polarity circuit at the other station, said drive line being normally non-operative, means at either station for rendering said drive line operative, means responsive to said last-mentioned means for transmitting an impulse thereover, means responsive to said impulse for energizing the first relay of the first pair of counting relays at each of said stations, means for simultaneously opening said drive line, means responsive to the opening of the drive line for energizing the second of said pair of counting relays, at each of said stations, means responsive to the energization of the second of said pair of counting relays for energizing the associated selecting relay at each station, means responsive to the opening of the drive line for switching the drive line from the one circuit at each station to the other circuit thereat, and means responsive to the energization of the selecting relay for reclosing the drive line.

22. In combination, a first station, a second station, a chain of counting relays arranged in pairs at each of said stations, a selecting relay individual to each of said pairs of counting relays at each of said stations, a battery at each station, a drive line connecting said stations, a circuit to the positive side of the battery and a circuit to the negative side of the battery at each of said stations, means for successively associating each of said circuits at each of said stations with said drive line, said means being effective to connect the positive-polarity circuit at the one station and the negative-polarity circuit at the other station to said drive line simultaneously, said drive line being normally open circuited, means at either station for closing said drive line, means responsive to the closing of said drive line, for transmitting an impulse thereover, means responsive to said impulse for energizing the first relay of the first of said pairs of counting relays at each of said stations, means for simultaneously opening said drive line, means responsive to the opening of the drive line for energizing the second relay of said first pair of counting relays at each of said stations, means responsive to the energization of the second of said pairs of counting relays for energizing the associated selecting relays at each station, means responsive to the opening of the drive line for switching the drive line from one circuit at each station to the other circuit thereat, means responsive to the energization of the selecting relay for reclosing the drive line, said impulse-responsive means being responsive to the closing of the drive line for transmitting a second impulse over said drive line of opposite polarity, means responsive to the second impulse for energizing the first of the succeeding pair of counting relays and means responsive to the energization of succeeding pairs of counting relays for opening the energizing circuit of said previously energized selecting relay at each station.

23. In combination, a first station, a second station, a plurality of apparatus units at said second station, operating means individual to each of said apparatus units at said first station, each having an operating position, a control line connecting said stations, synchronous selectors at each of said stations, means including said synchronous selectors for successively associating each of said apparatus units with said signalling line, means including said selectors for simultaneously associating said operating means individual to said apparatus units with said signalling line as the equivalent apparatus unit is associated therewith, means including said operating means in operated position for transmitting an operating impulse over said line to said apparatus unit, means responsive to said impulse for operating said associated apparatus unit, and means at said first station responsive to said operation of said apparatus units for rendering said operating means ineffective to further operate said unit while said unit and operating means are maintained associated with said signalling line.

24. In combination, a first station, a second station, a control line connecting said stations, apparatus units at the first station, an operating key individual to each of said apparatus units at said second station, said operating keys having no normal position, means for maintaining each of said operating keys in position to which it is last placed, selector apparatus at each of said stations for sequentially associating each of said apparatus units and associated operating keys with said signalling line, means operative following the association of one of said units and associated operating key with said line, responsive to the operation of said operating key to a predetermined position, for transmitting energy over said line, means responsive to said energy for operating the associated apparatus unit and means responsive to the operation of said apparatus unit for rendering said operating key non-operative to operate said apparatus unit while said unit and operating key are maintained associated with said signalling line.

25. In combination, a first station, a second station, apparatus units at said second station, operating means individual to each of said apparatus units at said first station having alternate positions, a control line connecting said stations, selecting means for successively associating each of said apparatus units and said operating means with said control line simultaneously, means whereby said selecting means maintains the association of said unit and operating means to said line indefinitely under control from the first station, means responsive to the operation of an operating means associated with said line for transmitting energy over said signalling line, means responsive to said energy for operating the associated apparatus unit, switching mechanism at said first station, means responsive to the operation of said apparatus unit for operating said switching mechanism to disconnect said operating means from said signalling line, and means whereby said operating means can be associated with said signalling line by operating said operating means to its alternate position and then again to its operated position.

26. In combination, a first station, a second station, a control line connecting said stations, a plurality of keys, having alternate positions, switching mechanism individual to each of said keys for controlling the connection of said keys to said line, selecting apparatus at each of said stations, apparatus units at said second station individual to each of said keys, means including said selecting apparatus for associating each of apparatus units with said signalling line, means including said selecting apparatus for simultaneously associating the keys individual thereto with said signalling line, said switching mechanism connecting its individual operating key to said signalling line as it is associated with said line by said selecting apparatus if said key is in position to operate its associated remote apparatus unit, whereby an impulse is transmitted over said line, means responsive to said impulse for operating said associated apparatus unit and means responsive to the operation of said associated apparatus units for operating said switching mechanism to disconnect said operated key from said signalling line and to associate it with said signalling line in its alternate position.

27. In combination, a first station, a second station, apparatus units at said second station, operating means individual thereto at said first station, a signalling line connecting said stations, selecting apparatus at each of said stations for associating one of said apparatus units and its associated operating means with said signalling line simultaneously, means for maintaining said apparatus unit and said operating means associated with said signalling line under control of said first station, means controlled by said operating means for transmitting energy over said signalling line, means responsive to said energy for operating the associated apparatus unit, means responsive to the complete operation of said apparatus units for rendering said operating means non-operative to further control the operation of said apparatus unit and means whereby said operating means may be again rendered operative to operate said apparatus unit.

28. In combination, a chain of relays, an impulsing line, a branch line for each relay connected to said impulsing line, one of said relays being connected to said impulsing line over its individual branch line, means for applying an impulse to said impulsing line, whereby the relay associated with said line is energized, said means being operative to terminate said impulse and means controlled by the operation of the first-mentioned relay and responsive to the termination of said impulse for connecting the succeeding relay to said impulsing line over its associated branch line.

29. In combination, a chain of relays, arranged in pairs, an impulsing line, a branch line for each relay connected to said impulsing line, one of said pairs of relays being connected to said impulsing line over its individual branch, means for applying an impulse to said impulsing line, whereby the relay of a pair associated with said line is energized, means to open said impulsing line, said second relay of said pair being responsive to the opening of said line for connecting a relay of the succeeding pair to the impulsing line over its associated branch.

30. In combination, a first station, a second station, a chain of counting relays at each of said stations, a chain of selecting relays at each of said stations, a drive line connecting said stations, means controlled by said selecting relays for closing said drive line to transmit impulses over said drive line, means responsive to said impulses transmitted over said drive line for energizing said counting relays sequentially at each of said stations and means responsive to the energization of said counting relays at each of said stations for energizing their associated selecting relays.

31. In combination, a first station, a second station, a chain of counting relays at each of said stations, a chain of selecting relays at each of said stations, a drive line, connecting said stations, means at both stations for transmitting an impulse over said drive line, means responsive to said impulse for energizing one of said counting relays at each of said stations, said means being operative in response to further impulses for successively energizing said counting relays at each of said stations, means responsive to the energization of said counting relays for energizing associated selecting relays and means responsive to the energization of the selecting relays for controlling the transmission of said impulses over said drive line.

32. In combination, a first station, a second station, apparatus units at said second station, operating means individual to said units at first station, a control line connecting said stations, synchronously operated selecting apparatus at each of said stations having an individual selecting position for each operating means, for sequentially associating said apparatus units and individual operating means with said control line simultaneously, means for stopping said selecting apparatus at any selecting position and an indicating device for each selecting position for indicating the position of said selecting apparatus, operative when the selector is on its position.

33. In combination, a first station, a second station, apparatus units at said second station, operating means individual to said units at said first station, a control line connecting said stations, synchronous selecting apparatus at each of said stations having individual selecting positions for each unit and operating means, said selecting apparatus sequentially associating said apparatus units to said control line and simultaneously associating said individual operating means to said line and an indicating device for each selecting position of said selecting apparatus at said first station for indicating the position of said selecting apparatus, each indicating device being operated when said selector is on the individual position of that indicating device, an indicating device individual to each of said apparatus units, and means including said selecting apparatus controlled by the position of said apparatus units for operating said signalling device to indicate the positions of said apparatus units.

34. In combination, a first station, a second station, a control line connecting the stations, apparatus units at said second station, operating means at said second station, a chain of counting relays at each of said stations, a selecting relay for each of said counting relays for controlling the sequential connection of said units and operating means to said line, means for transmitting impulses over said drive line, means responsive to said impulses for operating said counting relays, means responsive to the operation of said counting relays for operating the selecting relays whereby said apparatus units and associated operating means are simultaneously associated with said control line, and means at said first station for stopping the transmission of said drive impulses whereby the selectors are stopped at a selecting position at which an operating means and its associated apparatus unit are maintained connected to each other over said control line for an indefinite period of time under control from said first station.

35. In a supervisory control system, a first station, a second station, a group of counting relays at each of said stations, a selecting relay individual to each of said counting relays at each of said stations, a drive line connecting said stations, a control line connecting said stations, a stop key individual to each of said selecting relays, means for transmitting impulses over said drive line, means responsive to said impulses for operating said counting relays, means responsive to the synchronous operation of said counting relays at each station for successively energizing said selecting relays at each station, and means controlled by said stop keys for stopping the transmission of impulses over said drive line whereby the selecting relay at the position with which said stop key is associated is maintained energized.

36. In a supervisory control system, a first station, a second station, distributor means at each of said stations, each of said distributor means having a plurality of selecting positions, synchronizing means, means including said synchronizing means for operating said distributors at said stations over a predetermined number of said selecting positions in synchronism and means for switching said synchronizing means from one to a number of succeeding selecting positions, said synchronizing means thereupon operating said distributors in synchronism over said succeeding selecting positions.

37. In a signalling system, a first station, a second station, a distributor at each of said stations, each of said distributors having a plurality of selecting positions divided into groups, a synchronizing unit at each of said stations for operating said distributors in synchronism over one of said groups of selecting positions, means for switching said synchronizing units to another group of selecting positions, said synchronizing units thereupon operating said distributors in synchronism over said second group of selecting positions.

38. In a signalling system, a first station, a second station, a signalling line connecting said stations, distributors at each of said stations having a plurality of selecting positions, a synchronizing means at each of said stations associated with certain selecting positions, means for transmitting impulses over said signalling line, said synchronizing means being responsive to said impulses for operating said distributors in synchronism over a predetermined number of selecting positions, means responsive to the operation of said distributors to a predetermined one of said selecting positions for switching said synchronizing means at each station to be associated with others of said selecting positions, said synchronizing means being thereupon responsive to further impulses received over said line for operating said distributors over said further associated selecting positions.

39. In a signalling system, a first station, a second station, a distributor at each of said stations having a plurality of selecting positions, synchronizing means common to all of said selecting positions at each of said stations and associated with a predetermined number of selecting positions at each station, a signalling line connecting said stations, means responsive to the synchronous operation of said distributors for transmitting signalling impulses over said signalling line, means responsive to the signalling impulses for operating said synchronizing means, means responsive to the operation of said synchronizing means for operating said distributors at each of said stations in synchronism over the selected positions with which it is associated, and means responsive to the operation of said distributors to a predetermined one of said selected positions for switching said synchronizing means to be associated with other selecting positions, said synchronizing means being thereupon responsive to further signalling impulses for operating said distributors over said further selecting positions.

40. In a supervisory control system, a first station, a second station, selector means at each of said stations, each of said selector means having a plurality of selecting positions, synchronizing means, means including said synchronizing means for operating said selectors at said station over a predetermined number of said selecting positions in synchronism and means for switching said synchronizing means from one to a succeeding number of selecting positions, said synchronizing means thereupon operating said selectors in synchronism over said succeeding selecting positions.

41. In a signalling system, a first station, a second station, a selector at each of said stations, synchronizing means common to all of said selected positions at each of said stations, and associated with a predetermined number of selecting positions at each station, a signalling line connecting said stations, means responsive to the synchronous operation of said selectors for transmitting signalling impulses over said signalling line, means responsive to the signalling impulses for operating said synchronizing means, means responsive to the operation of said synchronizing means for operating said selectors at each of said stations in synchronism over the selected position with which it is associated and means responsive to the operation of said selectors to a predetermined one of said selected positions for switching said synchronizing means to be associated with other selecting positions, said synchronizing means being thereupon responsive to further signalling line impulses for operating said selectors over said selecting positions.

42. In a signalling system, a first station, a second station, relay chains at each of said stations, each of said relay chains having a plurality of selecting positions divided into groups, a synchronizing unit at each of said stations for operating said relay chains in synchronism over one of said groups of selecting positions, means for switching said synchronizing units to another group of selecting positions, said synchronizing units thereupon operating said relay chains in synchronism over said second group of selectors.

43. In a signalling system, a first station, a second station, a signalling line connecting said stations, relay chains at each of said stations having a plurality of selecting positions, a synchronizing means at each of said stations associated with certain selecting positions, means for transmitting impulses over said signalling line, said synchronizing means being responsive to said impulses for operating said relay chains in synchronism over a predetermined number of selecting positions, means responsive to the operation of said relay chains to a predetermined one of said selected positions for switching said synchronizing means at each station to be associated with others of said selecting positions, said synchronizing means being thereupon responsive to further impulses received over said line for operating said relay chains over said further associated selecting positions.

44. In a supervisory control system, a first station, a second station, equivalent groups of relays at each of said stations, a circuit between said stations, means including said circuit for simultaneously associating equivalent groups of said relays, means for operating the associated relays at each station sequentially, and a common synchronizing means for each group, switched from one to another group for operating each relay in a group simultaneously with its associated relay at the other station.

45. In a supervisory control system, a first station, a second station, a signalling line connecting said stations, apparatus units at said second station, chains of relays at each of said stations arranged in groups and comprising a relay individual to each of said apparatus units for sequentially associating said apparatus units with said signalling line, synchronizing means common to all groups, means for switching said synchronizing means from group to group and means controlled from each of said stations for operating the equivalent relays in equivalent groups at the two stations simultaneously.

46. In a supervisory control system, a first station, a second station, a signalling line connecting said stations, apparatus units at said second station, chains of relays at each of said stations arranged in groups and comprising a relay individual to each of said apparatus units for sequentially associating said apparatus units with said signalling line, and a common means at each station for each of said groups for controlling the synchronous energization of relays in equivalent groups at each of said stations and means for switching said common means from group to group.

In testimony whereof, I have hereunto subscribed my name this 7th day of March, 1924.

THOMAS U. WHITE.